(12) United States Patent
Tsunoda et al.

(10) Patent No.: US 11,884,309 B2
(45) Date of Patent: Jan. 30, 2024

(54) RAILCAR AIR CONDITIONING DUCT

(71) Applicant: KAWASAKI RAILCAR MANUFACTURING CO., LTD., Kobe (JP)

(72) Inventors: Koichi Tsunoda, Kobe (JP); Tomoki Nagai, Kobe (JP); Takashi Sasaki, Nagoya (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 348 days.

(21) Appl. No.: 17/272,525

(22) PCT Filed: Aug. 30, 2019

(86) PCT No.: PCT/JP2019/034104
§ 371 (c)(1),
(2) Date: Mar. 1, 2021

(87) PCT Pub. No.: WO2020/045624
PCT Pub. Date: Mar. 5, 2020

(65) Prior Publication Data
US 2021/0323585 A1  Oct. 21, 2021

(30) Foreign Application Priority Data
Aug. 31, 2018  (WO) .................. PCT/JP2018/032356

(51) Int. Cl.
*B61D 27/00* (2006.01)
*B60H 1/00* (2006.01)

(52) U.S. Cl.
CPC ..... *B61D 27/0018* (2013.01); *B60H 1/00371* (2013.01)

(58) Field of Classification Search
CPC .................. B60H 1/00371; B61D 27/0018
USPC ........................................... 454/103
See application file for complete search history.

(56) References Cited

U.S. PATENT DOCUMENTS

2016/0009299 A1*  1/2016  Tokuda ................ B61D 27/009
                                                454/87

FOREIGN PATENT DOCUMENTS

| JP | 5603153 B2 | 10/2014 | |
| JP | 2015-174644 A | 10/2015 | |
| WO | WO-2013098878 A1 * | 7/2013 | ............. B61D 27/00 |

* cited by examiner

*Primary Examiner* — Allen R. B. Schult
(74) *Attorney, Agent, or Firm* — Oliff PLC

(57) ABSTRACT

A railcar air conditioning duct according to one aspect which guides air fed from an air conditioner mounted on a railcar. The railcar includes: a duct wall forming an air flow passage which guides air in a car longitudinal direction; and a plurality of through holes lined up in the car longitudinal direction, the through holes being open at the duct wall as air outlet ports through which the air in the air flow passage is blown from the air flow passage toward a passenger room. A ratio of an opening area of one of the through holes to an area of one of a plurality of partial regions formed by dividing, in the car longitudinal direction, an inner surface of a lower wall portion such that in plan view, the regions contain the respective through holes falls within a range of 2.0% or more and 7.5% or less.

14 Claims, 19 Drawing Sheets

RAILCAR AIR CONDITIONING DUCT

TECHNICAL FIELD

The present invention relates to a railcar air conditioning duct through which air fed from an air conditioner mounted on a railcar is guided in a car longitudinal direction and is blown to a passenger room.

BACKGROUND ART

A railcar is equipped with an air conditioning system which maintains comfortable air environment in a passenger room. As shown in FIG. 6 of PTL 1, known as this type of conventional air conditioning system is an air conditioning system having a so-called plenum chamber structure in which an air conditioning duct arranged in a roof bodyshell is divided by a dividing wall into a main duct located at a car width direction middle and a sub duct located at a car width direction outer side and serving as an air reservoir. According to the air conditioning duct shown in FIG. 6 of PTL 1, the height of the dividing wall is gradually reduced from a car body middle toward car body end portions, and this stabilizes the velocity distribution of air from the air conditioning duct in the car longitudinal direction.

FIG. 1 of PTL 1 proposes an air conditioning duct having a chamber-less structure which forms a single air flow passage by removing the dividing wall between the main duct and the sub duct. According to this air conditioning duct, in order to uniformize the velocity of the air blown from the air conditioning duct in the car longitudinal direction, an air flow rate adjuster which hinders the flow of air-conditioning air is provided at a portion of the air flow passage extending in the car longitudinal direction.

CITATION LIST

Patent Literature

PTL 1: Japanese Patent No. 5,603,153

SUMMARY OF INVENTION

Technical Problem

As such railcar air conditioning duct, an air conditioning duct having a simpler configuration and capable of uniformizing the flow rate distribution of the air from the air conditioning duct in the car longitudinal direction is desired.

An object of the present invention is to provide a railcar air conditioning duct having a simpler configuration and capable of uniformizing the flow rate distribution of air blown from the air conditioning duct in a car longitudinal direction.

Solution to Problem

To solve the above problem, a railcar air conditioning duct according to one aspect of the present invention is a railcar air conditioning duct which guides air fed from an air conditioner mounted on a railcar. The railcar air conditioning duct includes: a duct wall forming an air flow passage which guides the air, fed from the air conditioner, in a car longitudinal direction; and a plurality of through holes lined up in the car longitudinal direction, the through holes being open at the duct wall as air outlet ports through which the air in the air flow passage is blown from the air flow passage toward a passenger room. A ratio of an opening area of one of the through holes to an area of one of a plurality of partial regions formed by dividing, in the car longitudinal direction, an inner surface of the lower wall portion such that in plan view, the partial regions contain the respective through holes falls within a range of 2.0% or more and 7.5% or less.

According to the above configuration, the ratio of the opening area of the air outlet port to the area of the partial region of the inner surface of the lower wall portion is designed so as to fall within a range of 2.0% or more and 7.5% or less. With this, the pressure difference in the air flow passage in the car longitudinal direction can be reduced. Therefore, the flow rate distribution of the air blown from the air conditioning duct in the car longitudinal direction can be uniformized by the simple configuration.

A railcar air conditioning duct according to another aspect of the present invention is a railcar air conditioning duct which guides air fed from an air conditioner mounted on a railcar. The railcar air conditioning duct includes: a duct wall forming an air flow passage which guides the air, fed from the air conditioner, in a car longitudinal direction; and a plurality of through holes lined up in the car longitudinal direction, the through holes being open at the duct wall as air outlet ports through which the air in the air flow passage is blown from the air flow passage toward a passenger room. A ratio of an opening area of one of the through holes to a total of opening areas of all the through holes that are open at the duct wall falls within a range of 0.05% or more and 0.65% or less.

According to the above configuration, the ratio of the opening area of one air outlet port to the total of the opening areas of the air outlet ports is designed so as to fall within a range of 0.05% or more and 0.65% or less. With this, the pressure difference in the air flow passage in the car longitudinal direction can be reduced. Therefore, the flow rate distribution of the air blown from the air conditioning duct in the car longitudinal direction can be uniformized by the simple configuration.

A railcar air conditioning duct according to yet another aspect of the present invention is a railcar air conditioning duct which guides air fed from an air conditioner mounted on a railcar. The railcar air conditioning duct includes: an air flow passage which extends in a car longitudinal direction and guides the air, fed from the air conditioner, in the car longitudinal direction; a chamber extending in the car longitudinal direction and arranged adjacent to the air flow passage in a direction perpendicular to the car longitudinal direction; a dividing wall which separates the air flow passage and the chamber from each other; a plurality of through holes which are lined up in the car longitudinal direction and are open at the dividing wall as communication holes which make the air flow passage and the chamber communicate with each other; and an air outlet port through which the air is blown from the chamber toward a passenger room. A ratio ($mm^2/mm^3$) of an opening area of one of the through holes to a volume of one of a plurality of partial spaces formed by dividing the air flow passage in the car longitudinal direction such that in plan view, the partial spaces correspond to the respective through holes falls within a range of $1.0 \times 10^{-4}$ or more and $3.4 \times 10^{-4}$ or less.

According to the above configuration, in the chamber-type air conditioning duct, the ratio ($mm^2/mm^3$) of the opening area of the communication hole to the volume of the partial space corresponding to the communication hole that is open at the dividing wall is designed so as to fall within a range of $1.0 \times 10^{-4}$ or more and $3.4 \times 10^{-4}$ or less. With this, the pressure difference in the air flow passage in the car longitudinal direction can be reduced, and as a result, the pressure difference in the chamber in the car longitudinal direction can be reduced. Therefore, the flow rate distribution of the air blown from the air conditioning duct in the car longitudinal direction can be uniformized by the simple configuration.

A railcar air conditioning duct according to still another aspect of the present invention is a railcar air conditioning duct which guides air fed from an air conditioner mounted on a railcar. The railcar air conditioning duct includes: an air flow passage which extends in a car longitudinal direction and guides the air, fed from the air conditioner, in the car longitudinal direction; a chamber extending in the car longitudinal direction and arranged adjacent to the air flow passage in a direction perpendicular to the car longitudinal direction; a dividing wall which separates the air flow passage and the chamber from each other; a plurality of through holes which are lined up in the car longitudinal direction and are open at the dividing wall as communication holes which make the air flow passage and the chamber communicate with each other; and a plurality of air outlet ports through which the air is blown from the chamber toward a passenger room. A ratio of an opening area of one of the through holes to a total of opening areas of all the through holes that are open at the dividing wall falls within a range of 0.05% or more and 0.65% or less.

According to the above configuration, in the chamber-type air conditioning duct, the ratio of the opening area of one communication hole to the total of the opening areas of the plurality of communication holes that are open at the dividing wall is designed so as to fall within a range of 0.05% or more and 0.65% or less. With this, the pressure difference in the air flow passage in the car longitudinal direction can be reduced, and as a result, the pressure difference in the chamber in the car longitudinal direction can be reduced. Therefore, the flow rate distribution of the air blown from the air conditioning duct in the car longitudinal direction can be uniformized by the simple configuration.

Advantageous Effects of Invention

The present invention can provide the railcar air conditioning duct having the simpler configuration and capable of uniformizing the flow rate distribution of the air blown from the air conditioning duct in the car longitudinal direction.

DESCRIPTION OF EMBODIMENTS

Figure 1:
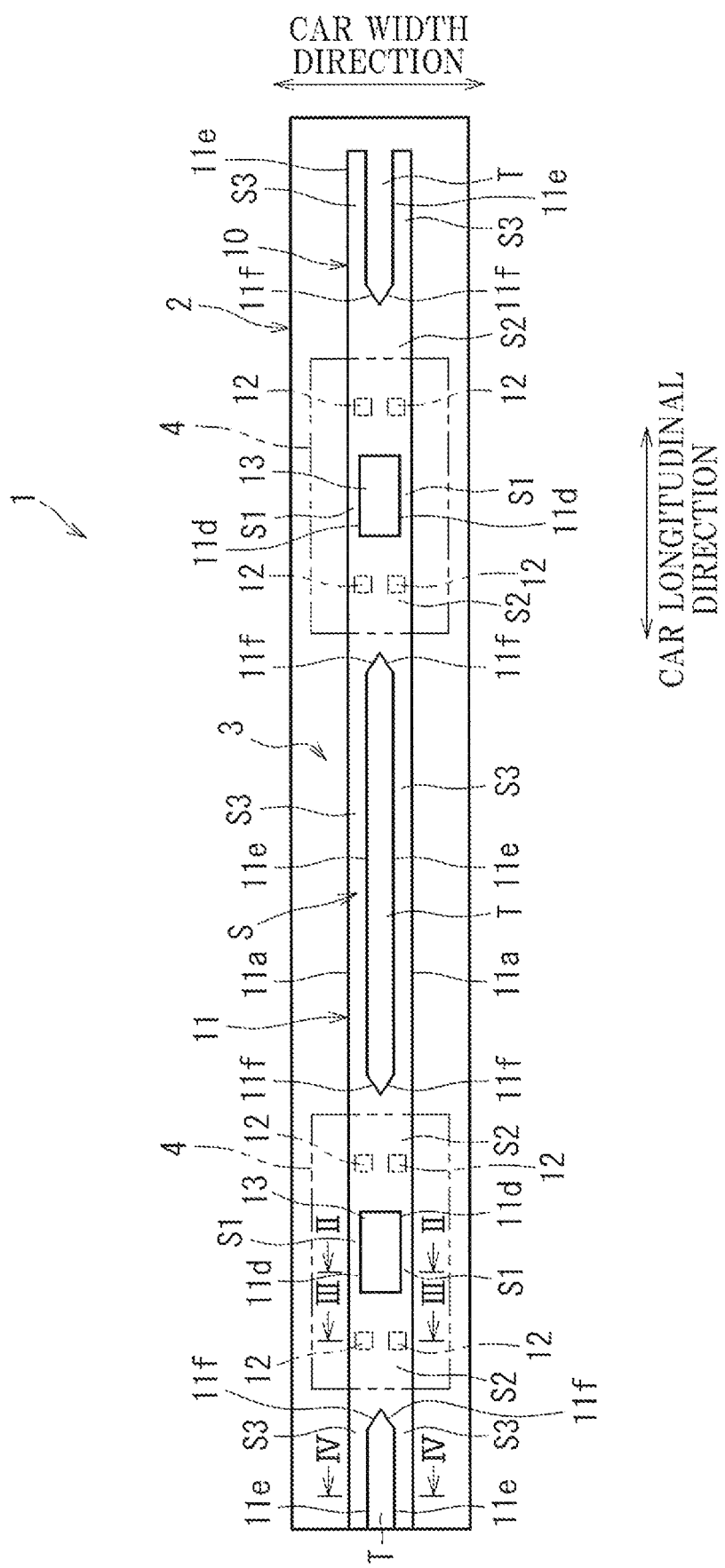
FIG. 1 is a top view and schematic sectional view showing a railcar equipped with an air conditioning duct according to Embodiment 1.

Hereinafter, embodiments will be described with reference to the drawings. It should be noted that in the drawings, the same reference signs are used for the same or corresponding components, and the repetition of the same explanation is avoided.

Embodiment 1

Figure 2:
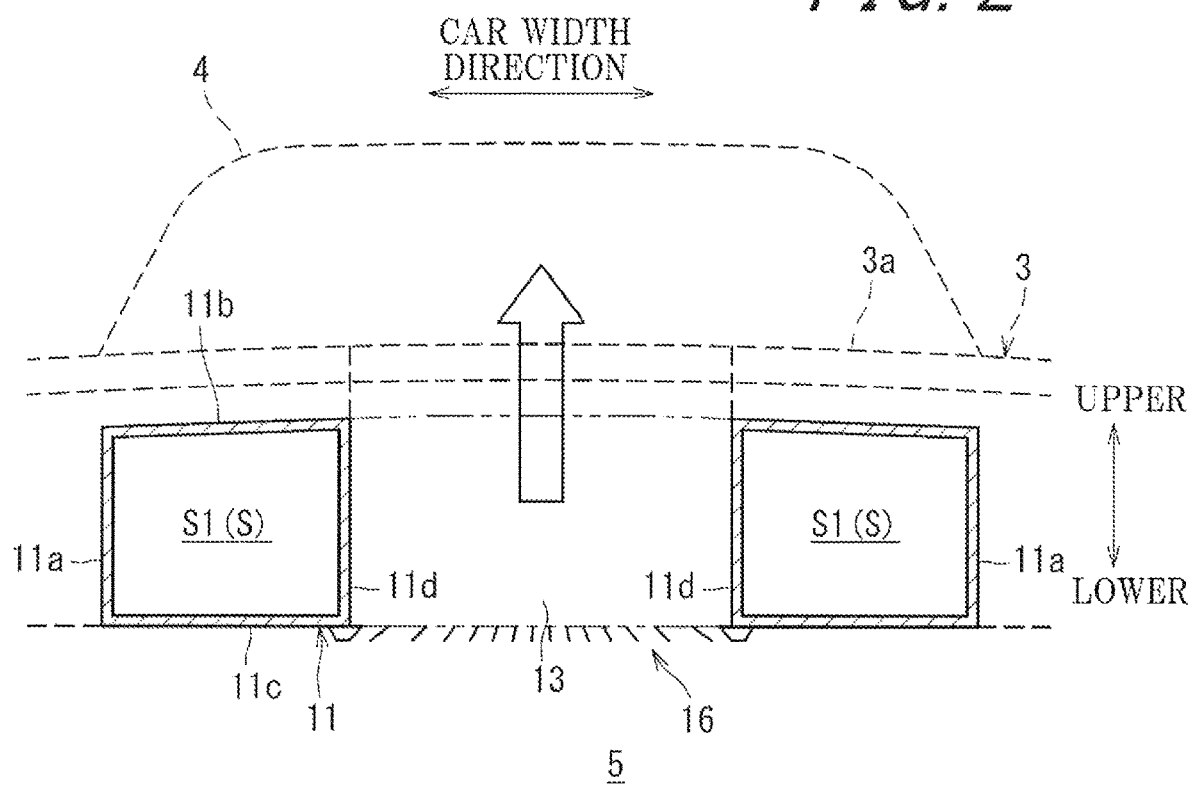
FIG. 2 is a schematic sectional view taken along line II-II of FIG. 1.
Figure 3:
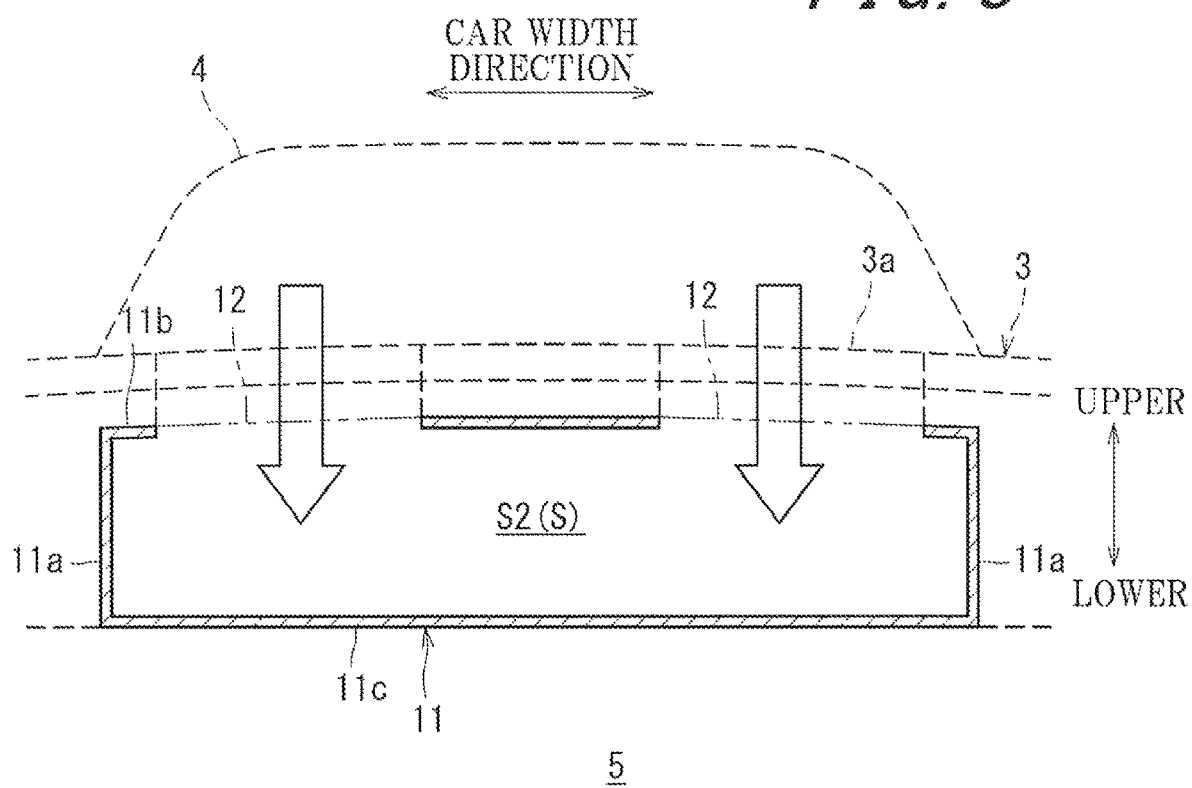
FIG. 3 is a schematic sectional view taken along line III-III of FIG. 1.
Figure 4:
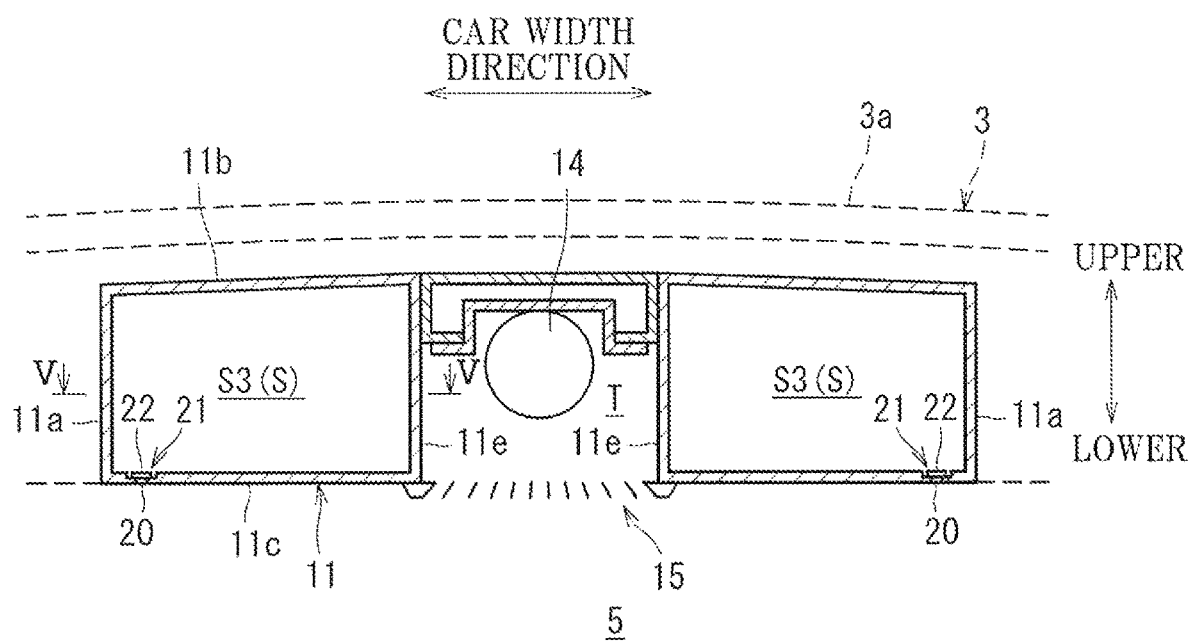
FIG. 4 is a schematic sectional view taken along line IV-IV of FIG. 1.

FIG. 1 is a top view and schematic sectional view showing a railcar 1 equipped with an air conditioning duct 10 according to Embodiment 1. FIG. 2 is a schematic sectional view (front view) taken along line II-II of FIG. 1. FIG. 3 is a schematic sectional view (front view) taken along line III-III of FIG. 1. FIG. 4 is a schematic sectional view (front view) taken along line IV-IV of FIG. 1.

A car body 2 of the railcar 1 includes a roof bodyshell 3 at an upper portion thereof. As shown in FIG. 1, two air conditioners 4 are provided above a roof plate 3a (see FIGS. 2 to 4) of the roof bodyshell 3 so as to be spaced apart from each other in a car longitudinal direction. Each of the air conditioners 4 adjusts the temperature of air that is a mixture of air sucked in from a passenger room 5 and outside air taken in from an outside of a car. Moreover, the air conditioning duct 10 extending in the car longitudinal direction is arranged above the passenger room 5 and inside the roof bodyshell 3. The air whose temperature has been adjusted by the two air conditioners 4 is fed to the air conditioning duct 10. To be specific, an air conditioning system included in the railcar 1 of the present embodiment is an integrated-distributed air conditioning system in which two large air conditioners are used in each car.

The air conditioning duct 10 guides the air, fed from the two air conditioners 4, in the car longitudinal direction and blows the air to the passenger room 5 through a plurality of below-described air outlet ports 20. The air conditioning duct 10 includes a duct wall 11 forming an air flow passage S which guides the air, fed from the air conditioners 4, in the car longitudinal direction. The duct wall 11 is constituted by a plurality of plate-shaped wall portions extending in the car longitudinal direction. The duct wall 11 of the air conditioning duct 10 has a structure that is substantially symmetrical in the car longitudinal direction and is substantially symmetrical in a car width direction. Specifically, the duct wall 11 includes a pair of side wall portions 11a, an upper wall portion 11b, and a lower wall portion 11c. The pair of side wall portions 11a extend in the car longitudinal direction. The upper wall portion 11b connects upper end portions of the pair of side wall portions 11a to each other in the car width direction. The lower wall portion 11c connects lower end portions of the pair of side wall portions 11a to each other in the car width direction.

As shown in FIGS. 1 and 3, four air feed ports 12 for each air conditioner 4 are open at the upper wall portion 11b of the duct wall 11, and therefore, eight air feed ports 12 are open in total. Regarding the eight air feed ports 12, two air feed ports 12 lined up so as to be spaced apart from each other in the car width direction forms a pair, and therefore, four pairs of air feed ports 12 are lined up so as to be spaced apart from each other in the car longitudinal direction. Air is supplied from each air conditioner 4 through the four air feed ports 12 to the air flow passage S.

Some spaces separated from the air flow passage S are formed at a car width direction middle side of the air conditioning duct 10. For example, as shown in FIGS. 1 and 2, a return duct 13 penetrating the air conditioning duct 10 and extending in an upper-lower direction is provided under each air conditioner 4 so as to be located between two pairs of air feed ports 12, provided so as to correspond to the air conditioner 4, in the car longitudinal direction. The return duct 13 is surrounded by a side wall portion 11d at four sides thereof, the side wall portion 11d being part of the duct wall 11 and arranged at the car width direction middle side of the pair of side wall portions 11a. The air conditioner 4 sucks the air of the passenger room 5, located under the air conditioning duct 10, through the return duct 13. An air straightening plate 16 is provided at an opening portion (air intake port) formed at the return duct 13 toward the passenger room 5.

Moreover, for example, as shown in FIG. 1, a space T where a lateral flow fan 14 is arranged is provided at an opposite side of the return duct 13 across the air feed ports 12. As shown in FIG. 4, the space T is separated from the air flow passage S by a pair of side wall portions 11e which are part of the duct wall 11 and opposed to each other in the car width direction. The pair of side wall portions 11e are located at the car width direction middle side of the pair of side wall portions 11a and extend in parallel with the car longitudinal direction. As shown in FIG. 1, a pair of side wall portions 11f are respectively connected to end portions, located close to the air feed ports 12, of the pair of side wall portions 11e. The pair of side wall portions 11f approach the car width direction middle as they approach the air feed ports 12. The pair of side wall portions 11f are connected to each other at the car width direction middle of the car body 2. It should be noted that as show in FIG. 4, an air straightening plate 15 is provided under the lateral flow fan 14 in the space T.

As above, some spaces separated from the air flow passage S are formed at the car width direction middle side of the air conditioning duct 10. Therefore, the air flow passage S is configured such that a plurality of regions S1, S2, and S3 (i.e., first air flow regions S1, a second air flow region S2, and third air flow regions S3) having different sections from each other are lined up in the car longitudinal direction.

Specifically, a pair of first air flow regions S1 are respectively formed at both sides of the return duct 13 in the car width direction. As shown in FIG. 2, each first air flow region S1 is sandwiched by the side wall portion 11a and the side wall portion 11d in the car width direction. To be specific, when viewed from the car longitudinal direction, each first air flow region S1 is a region surrounded by the upper wall portion 11b, the side wall portion 11a, the lower wall portion 11c, and the side wall portion 11d and having a substantially rectangular shape in sectional view.

The second air flow region S2 is continuous in the car longitudinal direction with both of the first air flow regions S1 located at both sides of the return duct 13 in the car width direction. To be specific, when viewed from the car longitudinal direction, the second air flow region S2 is a region surrounded by the upper wall portion 11b, the pair of side wall portions 11a, and the lower wall portion 11c and having a substantially rectangular shape in sectional view. As shown in FIG. 3, the air feed ports 12 are open at the upper wall portion 11b facing the second air flow region S2.

A pair of third air flow regions S3 are continuous with the second air flow region S2 at an opposite side of the return duct 13 in the car longitudinal direction. The pair of third air flow regions S3 are respectively located at both sides of the space T, where the lateral flow fan 14 is arranged, in the car width direction. The pair of third air flow regions S3 are arranged with a space at the car width direction middle and extend in the car longitudinal direction. Each third air flow region S3 is sandwiched by the side wall portion 11a and the side wall portion 11e in the car width direction. To be specific, when viewed from the car longitudinal direction, each third air flow region S3 is a region surrounded by the upper wall portion 11b, the side wall portion 11a, the lower wall portion 11c, and the side wall portion 11e and having a substantially rectangular shape in sectional view.

An outer surface (lower surface) of the lower wall portion 11c of the duct wall 11 faces the passenger room 5. The plurality of air outlet ports 20 (corresponding to "through holes" of the present invention) are open at the lower wall portion 11c. As shown in FIG. 4, in the air conditioning duct 10 of the present embodiment, the air flow passage S adopts a chamber-less structure which faces both the air feed ports 12 and the air outlet ports 20. To be specific, a divider which extends in the car longitudinal direction and divides the air flow passage S into a space facing the air feed ports 12 and a space facing the air outlet ports 20 is not provided in the duct wall 11. The air in the air flow passage S flows through the plurality of air outlet ports 20 to be blown from the air flow passage S toward the passenger room 5.

As shown in FIG. 4, a pair of grooves 21 are formed on an inner surface (upper surface) of the lower wall portion 11c so as to respectively face the pair of third air flow regions S3. Each groove 21 is located close to a car width direction outer side at the inner surface of the lower wall portion 11c (more specifically, at a position closer to the side wall portion 11a than the side wall portion 11e) and extends in the car longitudinal direction. In the present embodiment, each groove 21 is formed at a portion of the lower wall portion 11c which portion faces the third air flow region S3 and a portion of the lower wall portion 11c which portion faces part of the second air flow region S2 (more specifically, a region of the second air flow region S2 which region is located between the air feed ports 12 and the third air flow region S3 in the car longitudinal direction; see FIG. 10).

Figure 5:
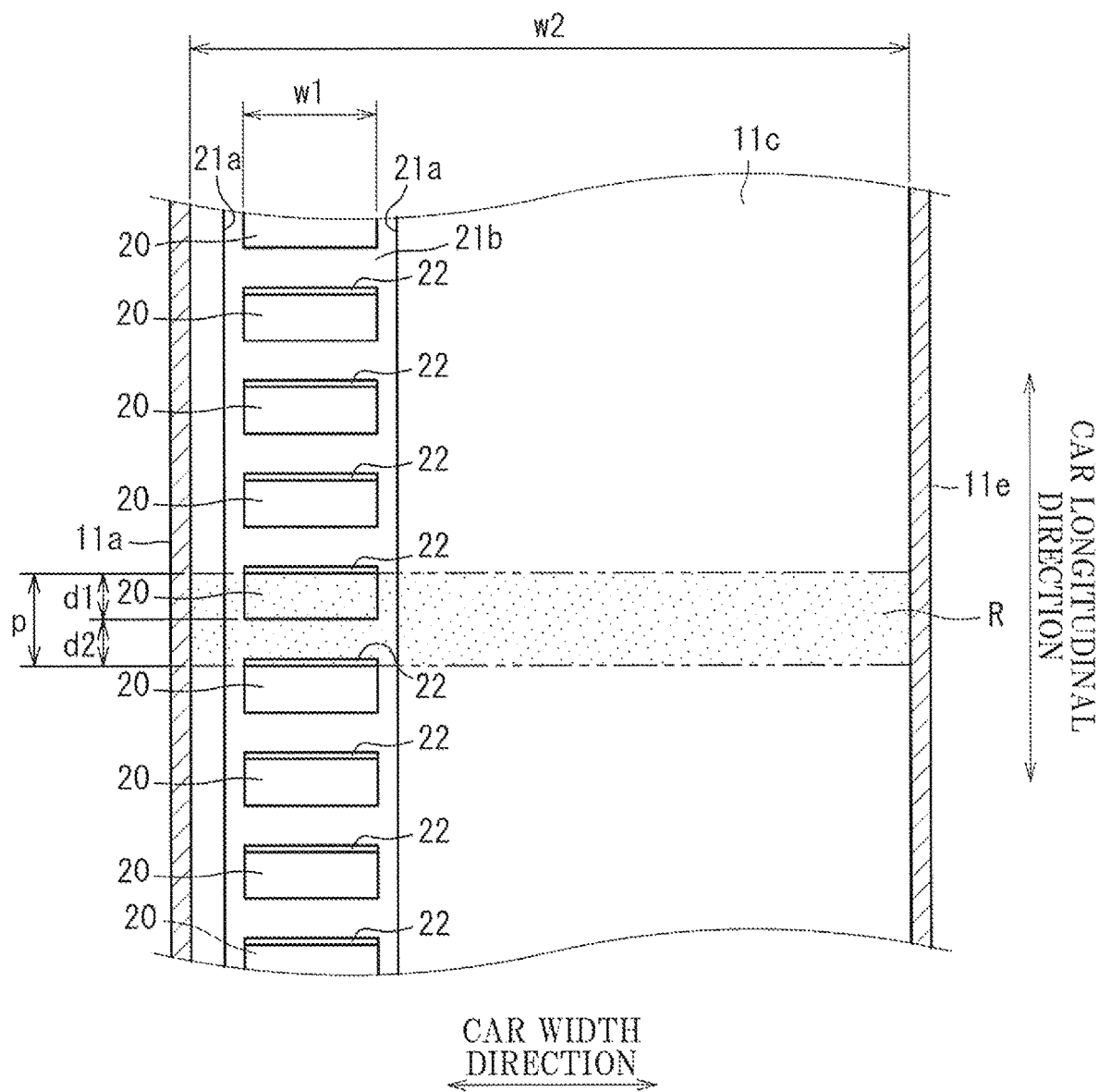
FIG. 5 is a schematic enlarged sectional view taken along line V-V of FIG. 4.
Figure 6:
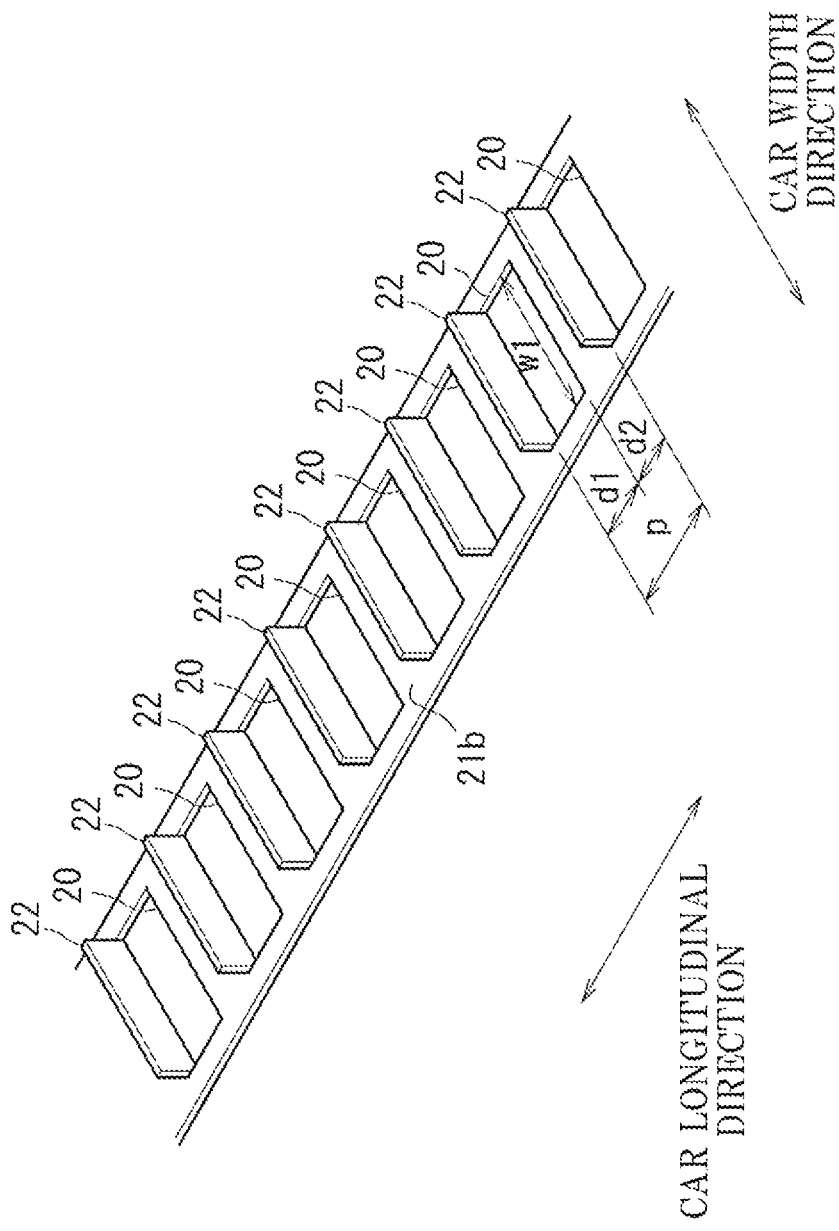
FIG. 6 is a schematic enlarged perspective view showing the vicinity of air outlet ports of the air conditioning duct shown in FIG. 1.

FIG. 5 is a schematic enlarged sectional view (top view) taken along line V-V of FIG. 4. FIG. 6 is a schematic enlarged perspective view showing the vicinity of the air outlet ports 20 of the air conditioning duct 10 shown in FIG. 1. It should be noted that in FIG. 6, only a bottom portion 21b of the groove 21 of the lower wall portion 11c is shown, and the other components are not shown.

As shown in FIG. 5, the groove 21 is constituted by a pair of side portions 21a and the bottom portion 21b. The pair of side portions 21a are opposed to each other in the car width direction. The bottom portion 21b connects lower end portions of the pair of side portions 21a. Moreover, as shown in FIG. 5, the plurality of air outlet ports 20 are provided at the bottom portion 21b of the groove 21 so as to be lined up and spaced apart from each other in the car longitudinal direction. In the present embodiment, the dimensions of the plurality of air outlet ports 20 are the same as each other. In other words, the shapes of the plurality of air outlet ports 20 are the same as each other, and opening areas A of the plurality of air outlet ports 20 are the same as each other. Specifically, as shown in FIGS. 5 and 6, in the present embodiment, each air outlet port 20 has such a rectangular shape in plan view that the length of one side thereof in the car longitudinal direction is shown by d1, and the length of one side thereof in the car width direction is shown by w1. The plurality of air outlet ports 20 are lined up in the car longitudinal direction at regular intervals p. To be specific, distances (gaps) d2 each between two air outlet ports 20 adjacent to each other in the car longitudinal direction are equal to each other.

In the present embodiment, the opening area A of each air outlet port 20 is designed so as to be smaller than the area of the air outlet port of a conventional air conditioning duct. Specifically, the air outlet ports 20 are provided such that a ratio X1 of the opening area A of one air outlet port to a total $A_{all}$ of the opening areas of all the air outlet ports 20 that are open at the duct wall 11 falls within a range of 0.05% or more and less than 0.15%.

To be specific, the ratio X1 is represented by Formula (1) below. The air conditioning duct 10 of the present embodiment is designed such that the ratio X1 satisfies Formula (2) below.

$$X1 = A/A_{all} \times 100 \quad (1)$$

$$0.05 \leq X1 < 0.15 \quad (2)$$

Moreover, as shown in FIG. 5, the air outlet ports 20 are provided such that a ratio X2 of the opening area A of one air outlet port 20 to an area B of one of a plurality of partial regions R formed by dividing, in the car longitudinal direction, the inner surface of the lower wall portion 11c facing the third air flow region S3 such that in plan view, each partial region R contains one air outlet port 20 falls within a range of 2.0% or more and less than 5.0%. To be specific, the partial region R has a rectangular shape in plan view. Regarding the rectangular partial region R, one side thereof extending in the car longitudinal direction extends from one car longitudinal direction end of a certain air outlet port 20 to one car longitudinal direction end of the adjacent air outlet port 20, and one side thereof extending in the car width direction extends from a lower end of the side wall portion 11a to a lower end of the side wall portion 11e in the car width direction.

Moreover, in the present embodiment, the plurality of air outlet ports 20 are lined up at the regular intervals p in the car longitudinal direction. Therefore, regarding all the air outlet ports 20 facing the third air flow region S3, the areas B of the partial regions R are the same as each other. To be specific, when the size of the third air flow region S3 in the car width direction is shown by w2, the ratio X2 is represented by Formula (3) below, and the air conditioning duct 10 of the present embodiment is designed such that the ratio X2 satisfies Formula (4) below.

$$X2 = A/B \times 100 = (w1 \times d1)/\{w2 \times (d1+d2)\} \times 100 \quad (3)$$

$$2.0 \leq X2 < 5.0 \quad (4)$$

Moreover, in the present embodiment, the air outlet ports 20 are provided such that a ratio X3 (mm²/mm³) of the opening area A of one air outlet port 20 to a volume V of one of a plurality of partial spaces formed by dividing the third air flow region S3 in the car longitudinal direction such that in plan view, the partial spaces correspond to the respective air outlet ports 20 falls within a range of $1.0 \times 10^{-4}$ or more and less than $2.3 \times 10^{-4}$. In short, the volume V of the partial space is a value obtained by multiplying a sectional area C of the air flow passage S (third air flow region S3) taken along a direction perpendicular to the car longitudinal direction by the interval p of the air outlet port 20. To be specific, the ratio X3 is represented by Formula (5) below, and the air conditioning duct 10 of the present embodiment is designed such that the ratio X3 satisfies Formula (6) below.

$$X3 = A/V = A/(C \times p) \quad (5)$$

$$1.0 \times 10^{-4} \leq X3 < 2.3 \times 10^{-4} \quad (6)$$

In the present embodiment, the third air flow region S3 has a substantially rectangular shape in sectional view. Therefore, the volume V of the partial space is substantially equal to a value obtained by multiplying the area A of the partial region R by the height of the third air flow region S3.

Moreover, in the present embodiment, each air outlet port 20 is designed such that the length w1 in the car width direction is longer than the length d1 in the car longitudinal direction. Specifically, when a ratio of the length d1 in the car longitudinal direction to the length w1 in the car width direction is a ratio Y, the ratio Y is represented by Formula (7) below, and the air conditioning duct 10 of the present embodiment is designed such that the ratio Y satisfies Formula (8) below.

$$Y = d1/w1 \quad (7)$$

$$0.25 \leq Y < 0.8 \quad (8)$$

In the present embodiment, an air receiving plate 22 which receives the air flowing through the air flow passage S projects upward at an opening edge portion of each air outlet port 20 so as to be located at a far side from the air conditioner 4. It should be noted that the plurality of air outlet ports 20 arranged between the two air conditioners 4 are classified into the air outlet ports 20 each provided with the air receiving plate 22 located at one side of the opening edge portion thereof in the car longitudinal direction and the air outlet ports 20 each provided with the air receiving plate 22 located at the other side of the opening edge portion thereof in the car longitudinal direction based on a boundary that is a middle between the two air conditioners 4 in the car longitudinal direction.

The air receiving plate 22 is a plate-shaped body having a substantially rectangular shape when viewed from the car longitudinal direction. The air receiving plates 22 provided at the opening edge portions of the air outlet ports 20 are the same in length in the upper-lower direction as each other. In the present embodiment, the length of the air receiving plate 22 in the upper-lower direction is designed so as to be shorter than the length of the side portion 21a of the groove 21 in the upper-lower direction.

As described above, the air conditioning duct 10 according to the present embodiment is designed such that: the opening area A of each air outlet port 20 is smaller than that of the air outlet port of the conventional air conditioning duct; the ratios X1, X2 respectively satisfy Formulas (2), (4), and (6); and a large number of air outlet ports 20 are continuously provided at narrow intervals. With this, the air flowing through the air flow passage S in the car longitudinal direction hardy flow out from the air outlet ports 20. Thus, the velocity of the air flow can be reduced, and a pressure difference in the third air flow region S3 in the car longitudinal direction can be reduced. Therefore, the flow rate distribution of the air blown from the air conditioning duct 10 in the car longitudinal direction can be uniformized by the simple configuration.

Moreover, in the present embodiment, each air outlet port 20 is designed such that: the length w1 in the car width direction is longer than the length d1 in the car longitudinal direction; and the ratio Y satisfies Formula (8). With this, the air flowing through the air flow passage S in the car longitudinal direction hardly flows out from the air outlet ports 20. In addition, the air is blown from the air outlet ports 20 also in a direction inclined relative to the car width direction. Thus, the flow rate distribution of the air blown from the air conditioning duct 10 in the car longitudinal direction can be further uniformized.

Moreover, in the present embodiment, the air receiving plate 22 which receives the air flowing through the air flow passage S projects at the opening edge portion of each air outlet port 20 so as to be located at the far side from the air conditioner 4. Therefore, the air receiving plate 22 receives the air flowing through the air flow passage S and guides the air to the air outlet port 20. With this, the flow velocity of the air blown from the air conditioning duct 10 can be reduced, and the air can be blown from the air outlet port 20 to the passenger room 5 in a direction further inclined relative to the car longitudinal direction.

Moreover, in the present embodiment, the outer surface of the lower wall portion 11c of the duct wall 11 faces the passenger room 5, and the plurality of air outlet ports 20 are provided at the bottom portions 21b of the grooves 21 formed at the inner surface of the lower wall portion 11c. Therefore, the thickness of the lower wall portion 11c of the duct wall 11 between the passenger room 5 and the air flow passage S is secured. Moreover, since the grooves 21 are formed at positions, where the air outlet ports 20 are arranged, on the inner surface of the lower wall portion 11c of the duct wall 11, the sectional area of the air flow passage S can be made as large as possible. With this, while suppressing the intrusion of the heat from the passenger room 5 through the duct wall 11 into the air flow passage S, the pressure difference in the air flow passage S in the car longitudinal direction can be reduced.

Moreover, in the present embodiment, since the opening areas A of the plurality of air outlet ports 20 are the same as each other, and the plurality of air outlet ports 20 are lined up in the car longitudinal direction at the regular intervals p (p=d1+d2), the air conditioning duct 10 can be easily manufactured.

Moreover, the air conditioning duct 10 of the present embodiment adopts the chamber-less structure. To be specific, a divider which extends in the car longitudinal direction and divides the air flow passage S into a space facing the air feed ports 12 and a space facing the air outlet ports 20 is not provided in the duct wall 11. Therefore, the air flow passage S can be manufactured more easily than a conventional plenum chamber type air conditioning duct, i.e., an air conditioning duct configured such that an air flow passage is divided by a dividing wall in a duct wall into a space to which air is fed through an air feed port and a space from which air is blown through an air outlet port.

Modified Example 1

Figure 7:
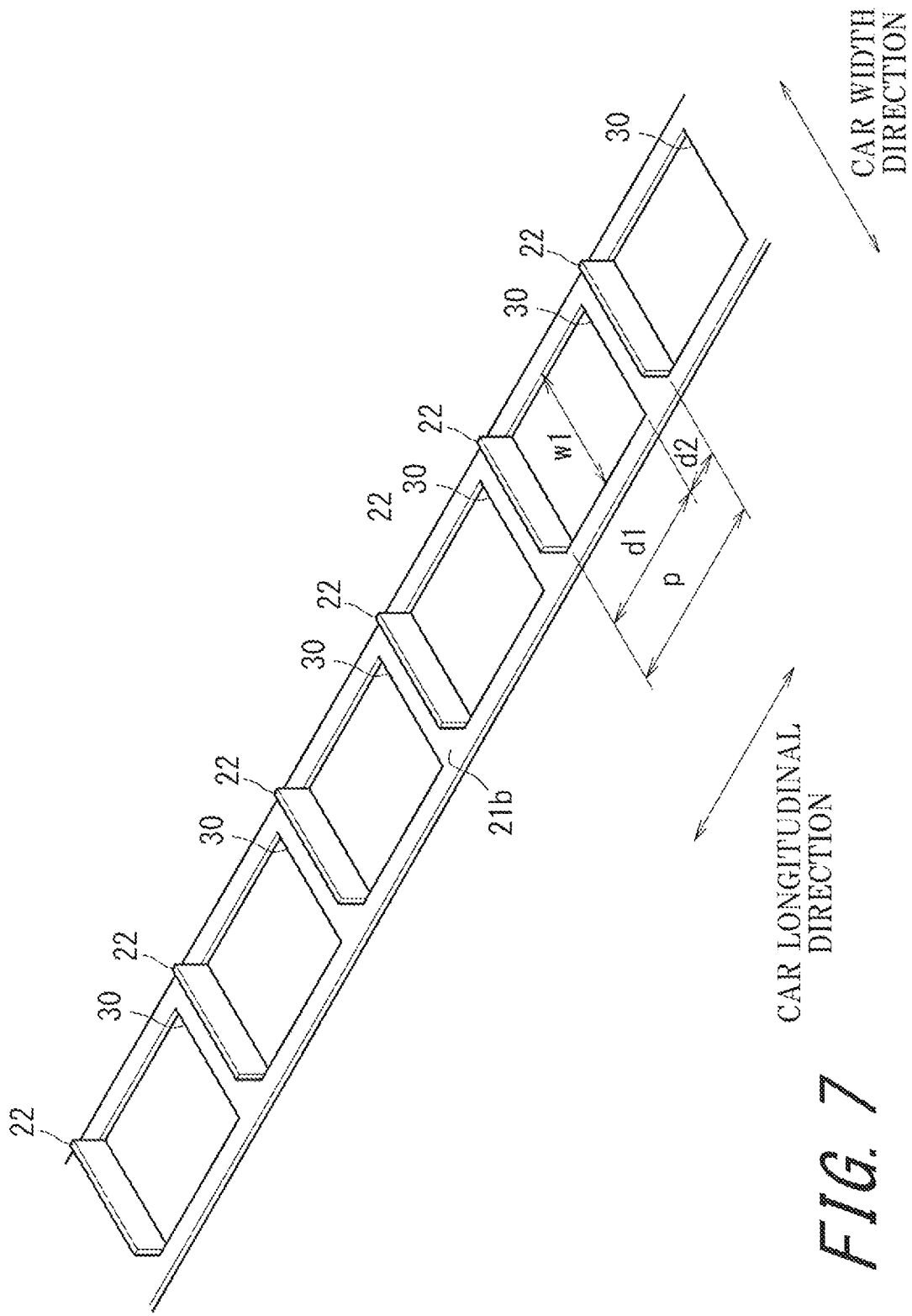
FIG. 7 is a schematic enlarged perspective view showing the vicinity of the air outlet ports of the air conditioning duct according to Modified Example 1.

FIG. 7 is a schematic enlarged perspective view showing the vicinity of air outlet ports 30 of the air conditioning duct according to Modified Example 1. The present modified example is the same in configuration as Embodiment 1 except for the air outlet ports 30. Therefore, the same reference signs as Embodiment 1 are used except for the air outlet port 30.

The present modified example is the same as Embodiment 1 in that the opening area A of each air outlet port 30 is designed so as to be smaller than the area of the air outlet port of the conventional air conditioning duct. It should be noted that the opening area A of the air outlet port 30 is larger than that of the air outlet port 20 of Embodiment 1. To be specific, in the present modified example, the ratios X1, X2, X3, and Y are designed so as to be different from those of Embodiment 1.

Specifically, the ratios X1, X2, and X3 are designed so as to respectively satisfy Formulas (9), (10), and (11) below.

$$0.15 \leq X1 \leq 0.30 \tag{9}$$

$$5.0 \leq X2 < 6.5 \tag{10}$$

$$2.3 \times 10^{-4} \leq X3 < 3.0 \times 10^{-4} \tag{11}$$

Moreover, in the present modified example, the ratio Y is designed so as to satisfy Formula (12) below.

$$0.8 \leq Y < 1.2 \tag{12}$$

According to the present modified example, the flow rate distribution of the air blown from the air conditioning duct 10 in the car longitudinal direction can be uniformized although such effect is inferior to that of Embodiment 1.

Modified Example 2

Figure 8:
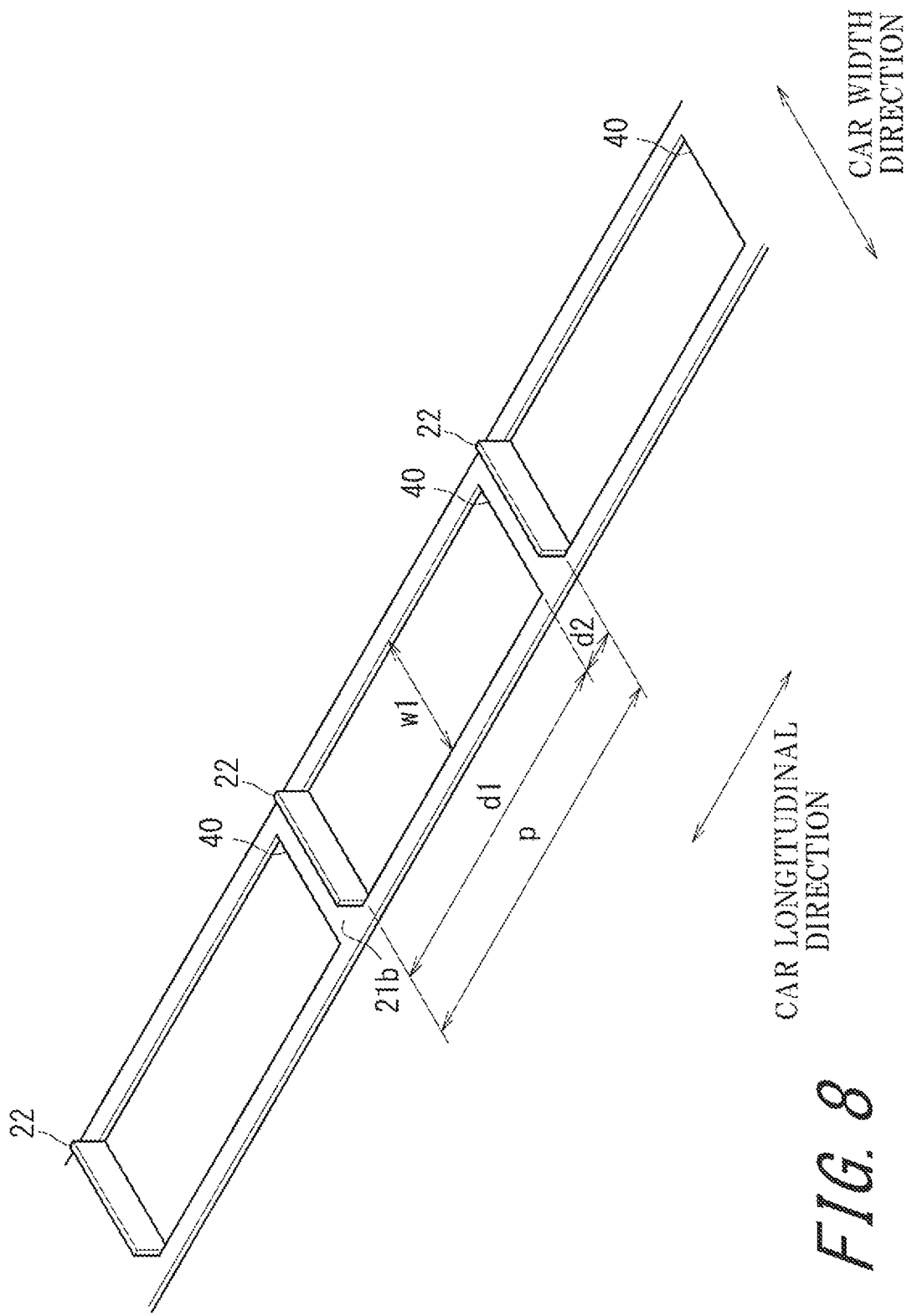
FIG. 8 is a schematic enlarged perspective view showing the vicinity of the air outlet ports of the air conditioning duct according to Modified Example 2.

FIG. 8 is a schematic enlarged perspective view showing the vicinity of air outlet ports 31 of the air conditioning duct according to Modified Example 2. The present modified example is the same in configuration as Embodiment 1 and Modified Example 1 except for the air outlet ports 31. Therefore, the same reference signs as Embodiment 1 and Modified Example 1 are used except for the air outlet port 31.

The present modified example is the same as Embodiment 1 and Modified Example 1 in that the opening area A of each air outlet port 31 is designed so as to be smaller than the area of the air outlet port of the conventional air conditioning duct. It should be noted that the opening area A of the air outlet port 31 is larger than each of the opening area A of the air outlet port 20 according to Embodiment 1 and the opening area A of the air outlet port 30 according to Modified Example 1. To be specific, in the present modified example, the ratios X1, X2, X3, and Y are designed so as to be different from those of Embodiment 1 and Modified Example 1.

Specifically, the ratios X1, X2, and X3 are designed so as to respectively satisfy Formulas (13), (14), and (15).

$$0.30 \leq X1 \leq 0.65 \quad (13)$$

$$6.5 \leq X2 \leq 7.5 \quad (14)$$

$$3.0 \times 10^{-4} \leq X3 \leq 3.4 \times 10^{-4} \quad (15)$$

Moreover, in the present embodiment, the ratio Y is designed so as to satisfy Formula (16) below.

$$1.2 \leq Y \leq 2.5 \quad (16)$$

According to the present embodiment, the flow rate distribution of the air blown from the air conditioning duct 10 in the car longitudinal direction can be uniformized although such effect is inferior to those of Embodiment 1 and Modified Example 1.

Modified Example 3

Figure 9:
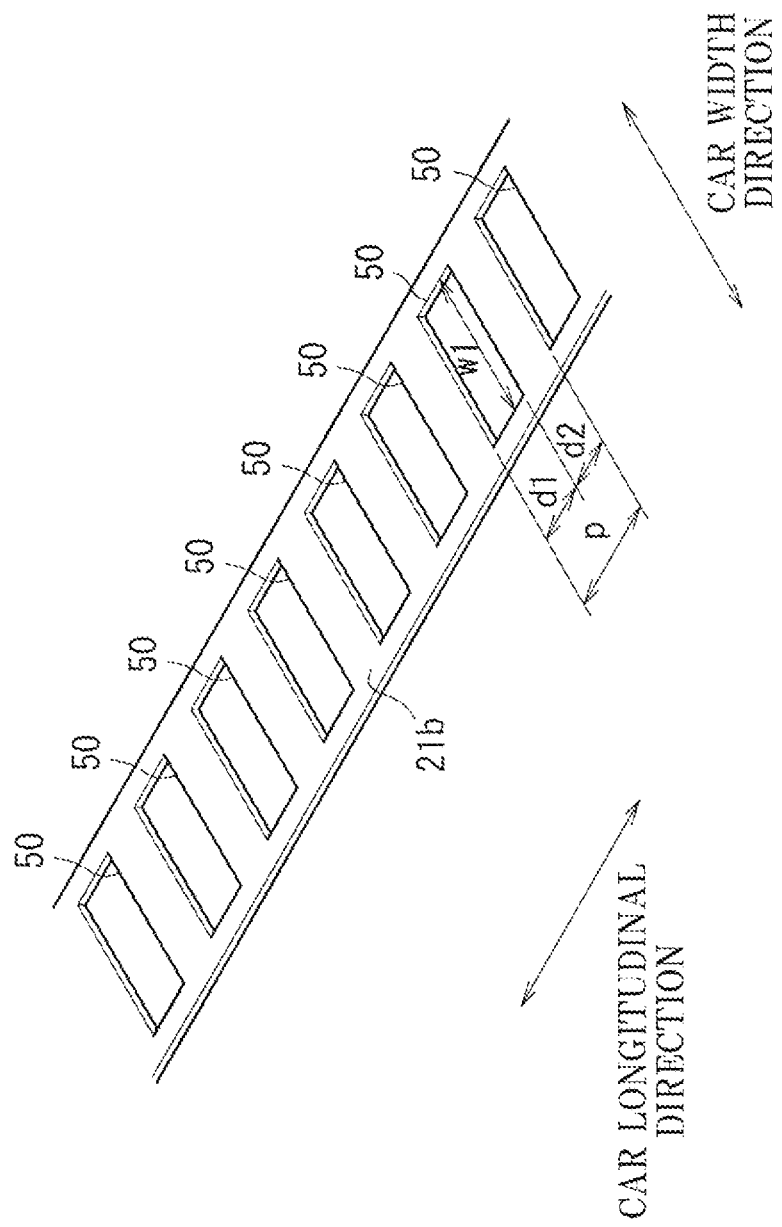
FIG. 9 is a schematic enlarged perspective view showing the vicinity of the air outlet ports of the air conditioning duct according to Modified Example 3.

FIG. 9 is a schematic enlarged perspective view showing the vicinity of air outlet ports 32 of the air conditioning duct according to Modified Example 3. The present modified example is different from Embodiment 1 in that the air receiving plate 22 is not provided at the opening edge portion of each air outlet port 32. Other than this, the present modified example is the same in configuration as Embodiment 1. To be specific, in the present modified example, the ratios X1, X2, X3, and Y are designed so as to be the same as those of Embodiment 1.

According to the present embodiment, the flow rate distribution of the air blown from the air conditioning duct 10 in the car longitudinal direction can be uniformized although such effect is inferior to that of Embodiment 1.

Analysis 1 Using Numerical Fluid Dynamics

Next, an analytical result of the flow rate distribution of the air blown from the air conditioning duct by computer simulation will be described with reference to FIGS. 10 to 14. Four Examples 1 to 4 analyzed correspond to Embodiment 1 and Modified Examples 1 to 3, respectively. Features of analytical models used in Examples 1 to 4 are shown in Table 1 below.

TABLE 1

|  | Example 1 | Example 2 | Example 3 | Example 4 |
|---|---|---|---|---|
| d1 [mm] | 8.6 | 24.8 | 57.2 | 8.6 |
| d2 [mm] | 7.6 | 7.6 | 7.6 | 7.6 |
| w1 [mm] | 29 | 29 | 29 | 29 |
| w2 [mm] | 361 | 361 | 361 | 361 |
| C [mm$^2$] | 79420 | 79420 | 79420 | 79420 |
| X1 [%] | 0.14 | 0.28 | 0.56 | 0.14 |
| X2 [%] | 4.26 | 6.15 | 7.09 | 4.26 |
| X3 [mm$^2$/mm$^3$] | $1.9 \times 10^{-4}$ | $2.8 \times 10^{-4}$ | $3.2 \times 10^{-4}$ | $1.9 \times 10^{-4}$ |
| Y [mm/mm] | 0.30 | 0.86 | 1.97 | 0.30 |
| Air receiving plate | Provided | Provided | Provided | Not provided |

As shown in Table 1, regarding the dimensions of the air conditioning duct including the dimensions of the air outlet port 20, the lengths d1 of the air outlet ports in the car longitudinal direction in Examples 1, 2, and 3 are respectively 8.6 mm, 24.8 mm, and 57.2 mm, and the other dimensions (d2, w1, and w2) in Examples 1 to 3 are equal to each other. Specifically, in each of Examples 1 to 3, the gap d2 between two air outlet ports in the car longitudinal direction is 7.6 mm, the length w1 of the air outlet port in the car width direction is 29 mm, and the dimension w2 of the third air flow region S3 in the car width direction is 361 mm. Moreover, in each of Examples 1 to 3, the air conditioning duct is mounted on a railcar that is 20 meters in length in the car longitudinal direction, and the length (hereinafter referred to as an "effective length") of a portion, where the air outlet ports are lined up at regular intervals, in the entire length of the air conditioning duct in the car longitudinal direction is 14 meters. Furthermore, in each of Examples, the height of the air flow passage S is 220 mm, and the sectional area C of the third air flow region S3 is 79420 mm$^2$. Table 1 also shows the ratios X1, X2, X3, and Y when the dimensions of the air conditioning ducts are set as above.

In the analytical model of Example 4, the air receiving plate is not provided at the opening edge portion of the air outlet port, and the dimensions d1, d2, w1, and w2 of the air conditioning duct are the same as those of Example 1.

Figure 10:
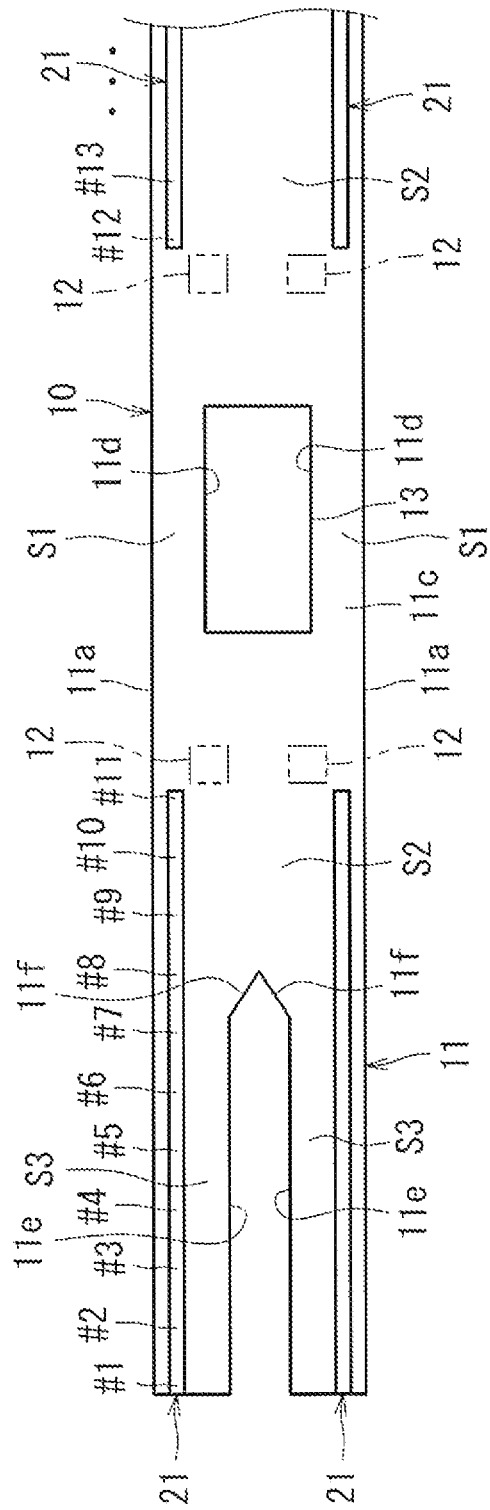
FIG. 10 is a diagram for explaining measurement points of a blowing air flow rate analyzed by numerical analysis.
Figure 11:
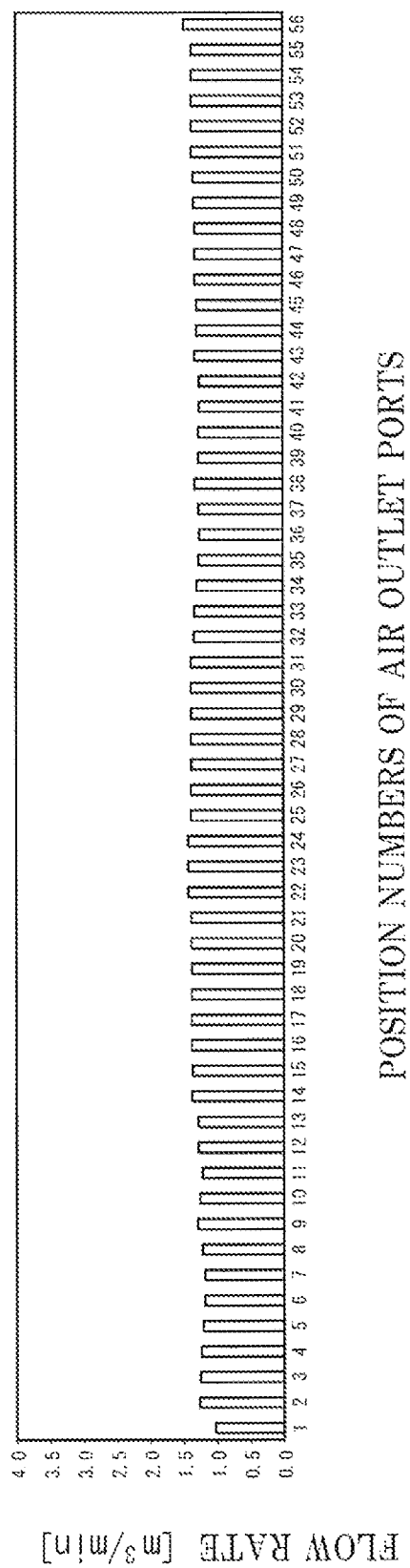
FIG. 11 is a graph showing a relation between the positions of the air outlet ports of the air conditioning duct according to Example 1 and the blowing air flow rates.
Figure 12:
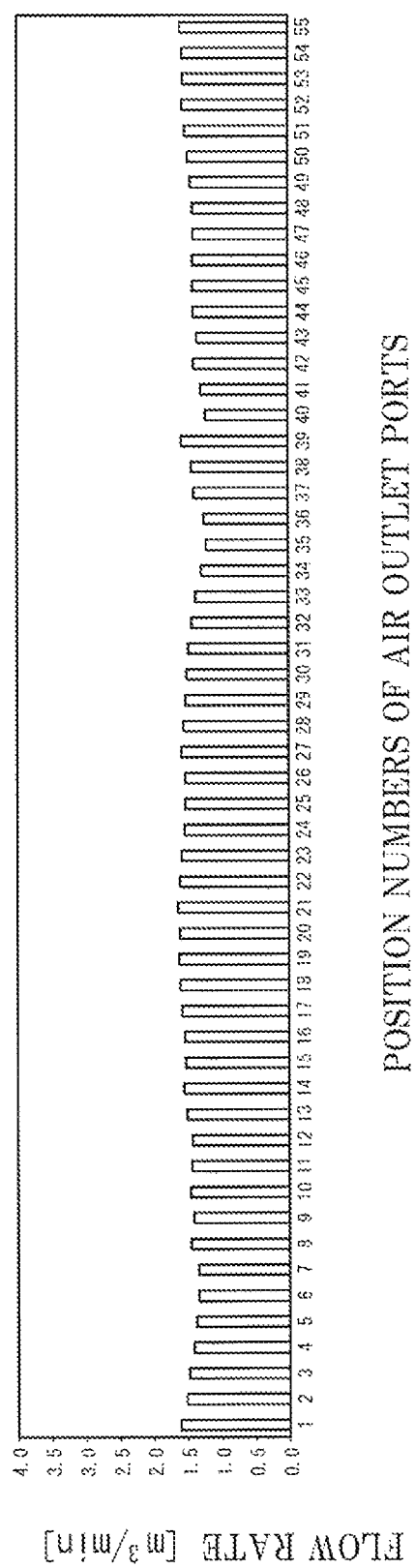
FIG. 12 is a graph showing a relation between the positions of the air outlet ports of the air conditioning duct according to Example 2 and the blowing air flow rates.
Figure 13:
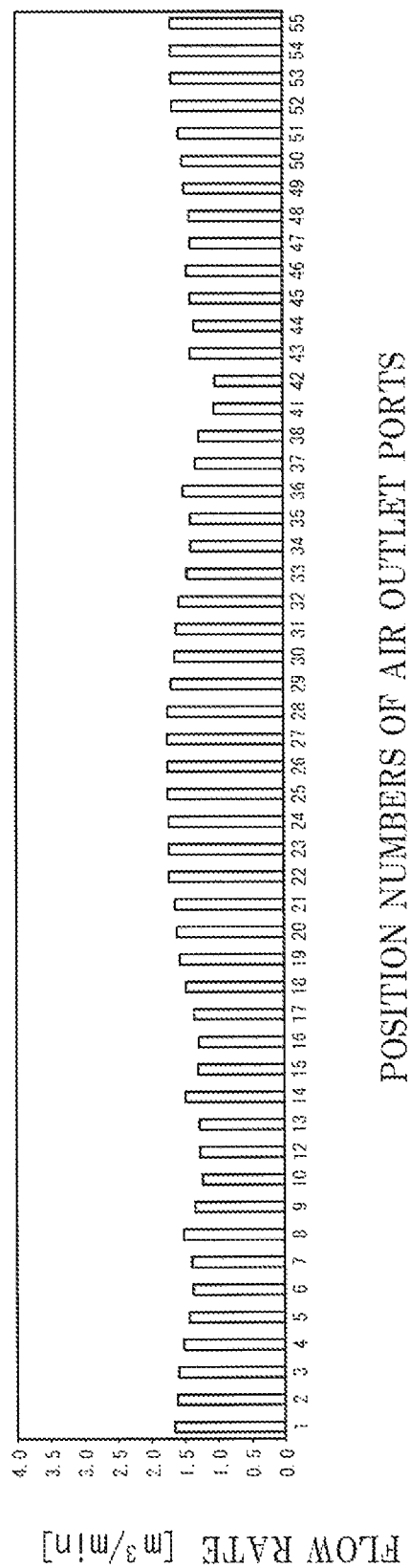
FIG. 13 is a graph showing a relation between the positions of the air outlet ports of the air conditioning duct according to Example 3 and the blowing air flow rates.
Figure 14:
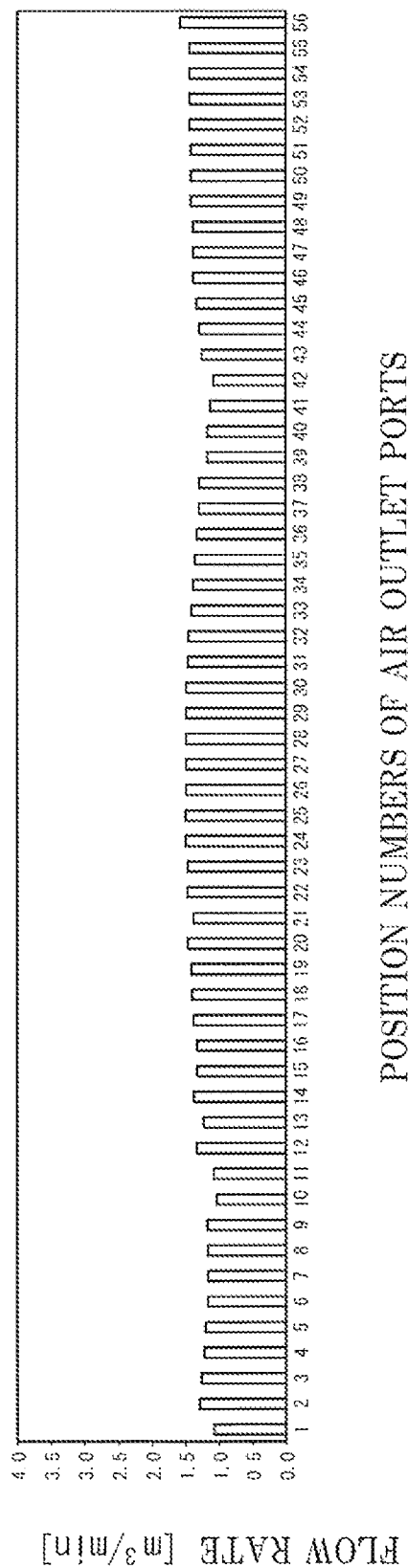
FIG. 14 is a graph showing a relation between the positions of the air outlet ports of the air conditioning duct according to Example 4 and the blowing air flow rates.

FIG. 10 is a diagram for explaining measurement points of a blowing air flow rate analyzed by numerical analysis. In each of Examples 1 to 4, 56 measurement points (#1 to #56) are provided so as to be lined up in the car longitudinal direction from one end portion of the air conditioning duct to the other end portion thereof in the car longitudinal direction, and the total of the flow rates of the air from a plurality of air outlet ports (15 air outlet ports) at each measurement point was calculated.

FIGS. 11 to 14 are graphs showing relations between the positions of the air outlet ports of the air conditioning ducts and the blowing air flow rates according to Examples 1 to 4. Regarding each of the flow rate distributions in Examples 1 to 4, the uniformity thereof within a practical range was obtained. According to the comparison among the flow rate distributions of Examples 1 to 3, the uniformity of the flow rate distribution of Example 2 was higher than that of Example 3, and the uniformity of the flow rate distribution of Example 1 was higher than that of Example 2. To be specific, the smaller the opening area of each air outlet port was, the more the uniformity of the flow rate distribution improved. Moreover, according to the comparison among the flow rate distributions of Examples 1 and 4, the uniformity of the flow rate distribution of Example 1 was higher than that of Example 4. The role of the air receiving plate is to blow the air from the air outlet port to the passenger room in the direction further inclined relative to the car longitudinal direction. It was confirmed from this analytical result that the air receiving plate contributed to the improvement of the uniformity of the flow rate distribution.

Embodiment 2

Next, the air conditioning duct according to Embodiment 2 will be described with reference to FIGS. 15 to 17.

Figure 15:
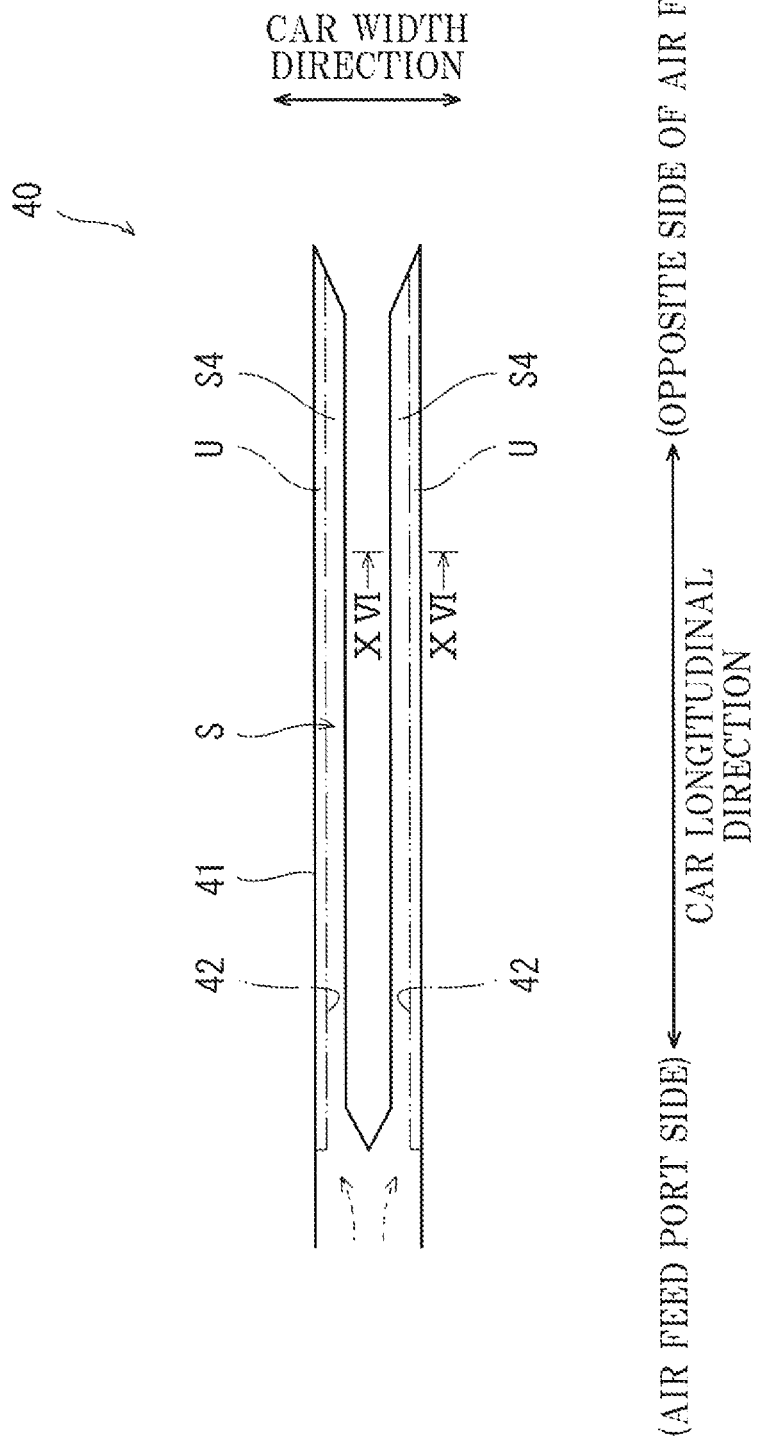
FIG. 15 is a top view and schematic sectional view showing part of the air conditioning duct according to Embodiment 2.

FIG. 15 is a top view and schematic sectional view showing part of an air conditioning duct 40 according to Embodiment 2. Specifically, FIG. 15 shows a part located at one car longitudinal direction end portion of the air conditioning duct 40. In the air conditioning duct 40, the air flow passage S which guides the air, fed from the air conditioner, in the car longitudinal direction includes a pair of fourth air flow regions S4. The pair of fourth air flow regions S4 are located at positions away from each other in the car width direction and extend in the car longitudinal direction. The air fed from the air conditioner (not shown) through the air feed ports (not shown) to the air conditioning duct 40 flows in directions shown by arrows shown in the air flow passage S of FIG. 15.

Figure 16:
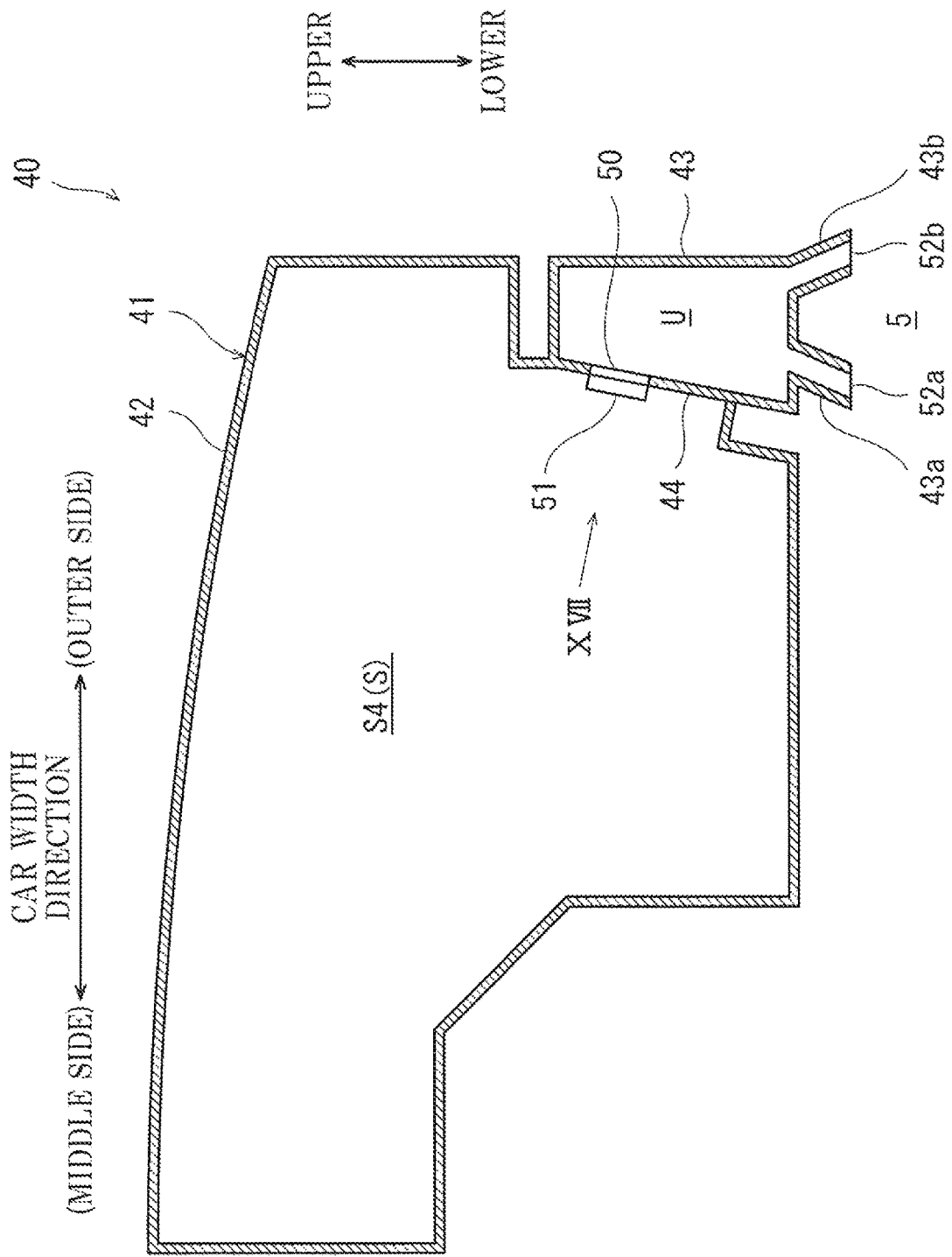
FIG. 16 is a schematic sectional view taken along like XVI-XVI of FIG. 15.

FIG. 16 is a schematic sectional view (front view) taken along line XVI-XVI of FIG. 15. The air conditioning duct 40 of the present embodiment adopts a plenum chamber structure. To be specific, the air conditioning duct 40 includes a duct wall 41 which forms the air flow passage S (more specifically, the fourth air flow regions S4) and chambers U. The chambers U are formed so as to correspond to the respective fourth air flow regions S4 (see FIG. 15). The duct wall 41 includes dividing walls 44 each of which separates the fourth air flow region S4 and the chamber U from each other. In the air conditioning duct 40, the air flowing through the air flow passage S passes through the chamber U to be blown to the passenger room 5.

The air flow passage S extends in the car longitudinal direction and guides the air, fed from the air conditioner, in the car longitudinal direction. The chamber U extends in the car longitudinal direction and is arranged adjacent to the air flow passage S in a direction perpendicular to the car longitudinal direction. In the present embodiment, the duct wall 41 includes a main duct wall 42 and a chamber wall 43. The main duct wall 42 forms the air flow passage S, and the chamber wall 43 forms the chamber U. The main duct wall 42 and the chamber wall 43 may be formed by separate components or may be formed by an integrated component.

The dividing wall 44 extends in the car longitudinal direction. When viewed from a direction along the car longitudinal direction, the dividing wall 44 extends substantially in the upper-lower direction. One surface of the dividing wall 44 faces the air flow passage S, and an opposite surface of the dividing wall 44 faces the chamber U. The air flow passage S is arranged at the car width direction middle side of the dividing wall 44, and the chamber U is arranged at the car width direction outer side of the dividing wall 44.

A plurality of communication holes 50 (corresponding to "through holes" of the present invention) lined up in the car longitudinal direction are open at the dividing wall 44. The plurality of communication holes 50 make the air flow passage S and the chamber U communicate with each other. The air in the air flow passage S is fed from the air flow passage S through the plurality of communication holes 50 to the chamber U.

Figure 17:
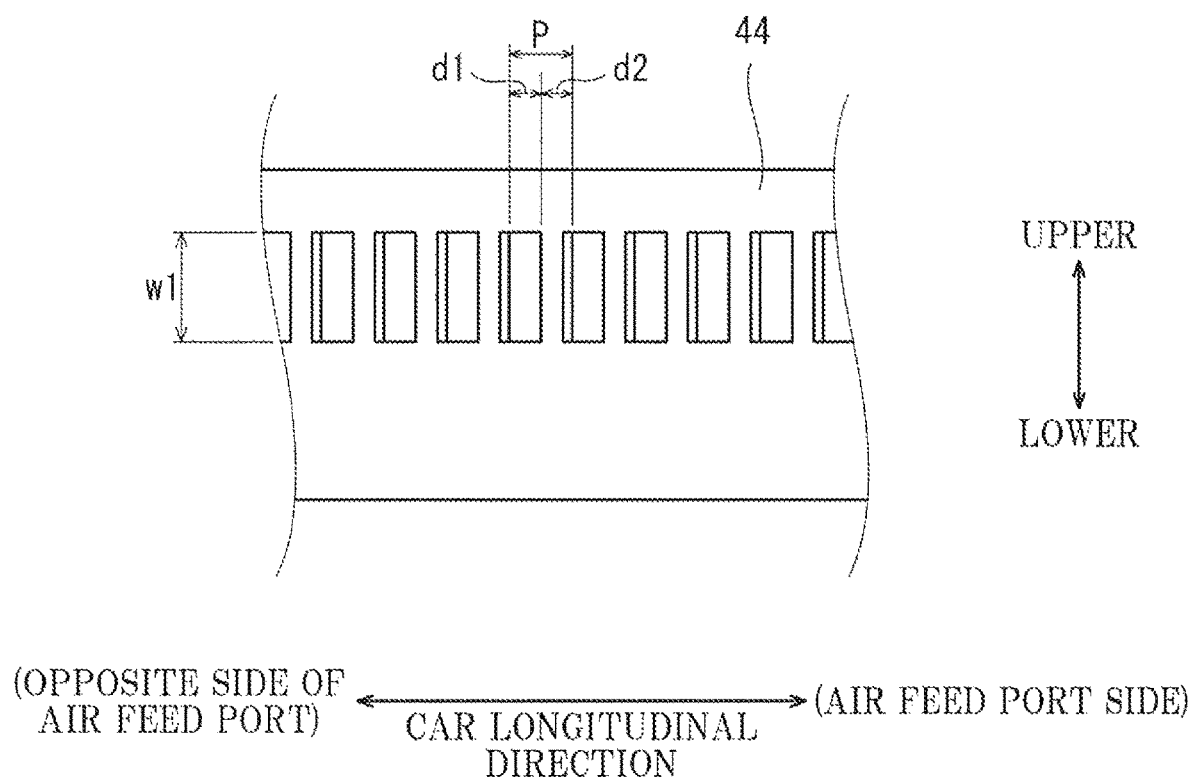
FIG. 17 is a diagram when viewed from a direction shown by an arrow XVII of FIG. 16.

FIG. 17 is a diagram when viewed from a direction shown by an arrow XVII of FIG. 16, i.e., when the dividing wall 44 is viewed from the air flow passage S side. The dimensions, shapes, sizes, intervals, and the like of the plurality of communication holes 50 are the same as those of the plurality of air outlet ports 20 described in Embodiment 1 and Modified Examples of Embodiment 1.

To be specific, the dimensions, shapes, and opening areas A of the plurality of communication holes 50 are the same as each other. Specifically, as shown in FIG. 17, each of the communication holes 50 has such a rectangular shape that the length of one side thereof in the car longitudinal direction is shown by d1, and the length of one side thereof in a direction perpendicular to the car longitudinal direction along the dividing wall 44 is shown by w1. Moreover, the plurality of communication holes 50 are lined up in the car longitudinal direction at regular intervals p. To be specific, the distances (gaps) d2 each between two communication holes 50 adjacent to each other in the car longitudinal direction are equal to each other.

In the present embodiment, the opening area A of each communication hole 50 is designed so as to be smaller than the area of the communication hole 50 of the conventional air conditioning duct. Specifically, the communication holes 50 are provided such that the ratio X1 of the opening area A of one communication hole 50 to the total $A_{all}$ of the opening areas of all the communication holes 50 that are open at the dividing wall 44 falls within a range of 0.05% or more and 0.65% or less. To be specific, the air conditioning duct 40 of the present embodiment is designed such that the ratio X1 satisfies Formula (17) below.

$$0.05 \leq X1 \leq 0.65 \tag{17}$$

Moreover, in the present embodiment, the communication holes 50 are provided such that the ratio (mm²/mm³) of the opening area A of one communication hole 50 to the volume V of one of a plurality of partial spaces formed by dividing the fourth air flow region S4 in the car longitudinal direction such that in plan view, the partial spaces correspond to the respective communication holes 50 falls within a range of $1.0 \times 10^{-4}$ or more and $3.4 \times 10^{-4}$ or less. In short, the volume V of the partial space is a value obtained by multiplying the sectional area C of the air flow passage S (fourth air flow region S4) taken along a direction perpendicular to the car longitudinal direction by the interval p of the communication hole 50. To be specific, the ratio X3 is represented by Formula (18) below, and the air conditioning duct 40 of the present embodiment is designed such that the ratio X3 satisfies Formula (18) below.

$$1.0 \times 10^{-4} \leq X3 \leq 3.4 \times 10^{-4} \tag{18}$$

An air receiving plate 51 which receives the air flowing through the fourth air flow region S4 projects at an opening edge portion of each communication hole 50 so as to be located at a far side from the air conditioner 4. Since the air receiving plate 51 is the same in configuration as the air receiving plate 22 of Embodiment 1, the explanation thereof is omitted.

Two air outlet ports 52a and 52b which make the chamber U and the passenger room 5 communicate with each other are open at the chamber wall 43. The two air outlet ports 52a and 52b extend in the car longitudinal direction. Moreover, the two air outlet ports 52a and 52b are lined up in the car width direction. The air outlet port 52b is located at the car width direction outer side of the air outlet port 52a.

The chamber wall 43 includes two branch portions 43a and 43b formed such that a gap therebetween when viewed from the car longitudinal direction increases as the two branch portions 43a and 43b extend downward. The air outlet ports 52a and 52b are respectively formed at lower ends of the two branch portions 43a and 43b. Therefore, the air in the chamber U is blown through the air outlet port 52a toward a car width direction middle portion in the passenger room 5 and is also blown through the air outlet port 52b to the car width direction middle portion in the passenger room 5.

The air conditioning duct 40 according to the present embodiment is designed such that: the opening area A of each communication hole 50 which makes the air flow passage S and the chamber U communicate with each other is smaller than the area of the communication hole of the conventional air conditioning duct; the ratios X1 and X3 respectively satisfy Formulas (17) and (18); and a large number of communication holes 50 are continuously provided at narrow intervals. With this, the pressure difference in the air flow passage S in the car longitudinal direction can be reduced, and as a result, the pressure difference in the chamber U in the car longitudinal direction can be reduced. Therefore, the flow rate distribution of the air blown from the air conditioning duct 40 in the car longitudinal direction can be uniformized by the simple configuration.

Analysis 2 Using Numerical Fluid Dynamics

Next, an analytical result of the flow rate distribution of the air blown from the air conditioning duct by computer simulation will be described with reference to FIG. 18. The configuration of Example 5 analyzed corresponds to the above configuration of Embodiment 2. Features of an analytical model used in Example 5 are shown in Table 2 below.

TABLE 2

|  | Example 5 |
| --- | --- |
| d1 [mm] | 8.6 |
| d2 [mm] | 7.6 |
| w1 [mm] | 29 |
| C [mm$^2$] | 107000 |
| X1 [%] | 0.14 |
| X3 [mm$^2$/mm$^3$] | $1.4 \times 10^{-4}$ |
| Y [mm/mm] | 0.30 |
| Air receiving plate | Provided |

As shown in Table 2, regarding the dimensions of the air conditioning duct including the dimensions of the communication hole, the dimensions and intervals of the communication holes in Example 5 were set to be equal to the dimensions and intervals of the air outlet ports in Example 1. To be specific, the length d1 of the communication hole in the car longitudinal direction is 8.6 mm, the gap d2 between the two communication holes in the car longitudinal direction is 7.6 mm, and the length w1 of the communication hole in the car width direction is 29 mm. As with Example 1, in Example 5, the air conditioning duct is mounted on a railcar that is 20 meters in length in the car longitudinal direction, and the length (hereinafter referred to as the "effective length") of a portion, where the communication holes are lined up at regular intervals, in the entire length of the air conditioning duct in the car longitudinal direction is 14 meters. Furthermore, the sectional area C of the air flow passage S is 0.107×10$^6$ mm$^2$ (=0.107 m$^2$). Table 2 also shows the ratios X1, X3, and Y when the dimensions of the air conditioning duct are set as above.

Figure 18:
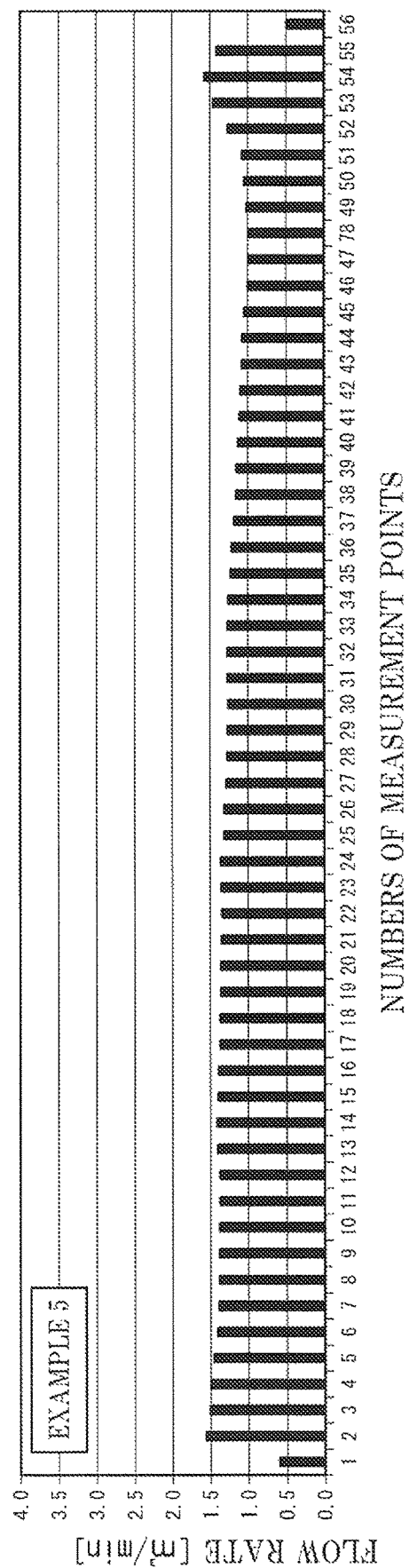
FIG. 18 is a graph showing a relation between the measurement points of the air conditioning duct according to Example 5 and the blowing air flow rates.

FIG. 18 is a graph showing a relation between the measurement points of the air conditioning duct according to Example 5 and the blowing air flow rates. In Example 5, 56 measurement points (#1 to #56) are provided so as to be lined up in the car longitudinal direction from one end portion of the air conditioning duct to the other end portion thereof in the car longitudinal direction, and the flow rate of the air from the air outlet ports at each measurement point was calculated. It was confirmed from FIG. 18 that regarding the flow rate distribution in Example 5, the uniformity thereof within a practical range was obtained.

Embodiment 3

Next, the air conditioning duct according to Embodiment 3 will be described with reference to FIGS. 19 and 20.

Figure 19:
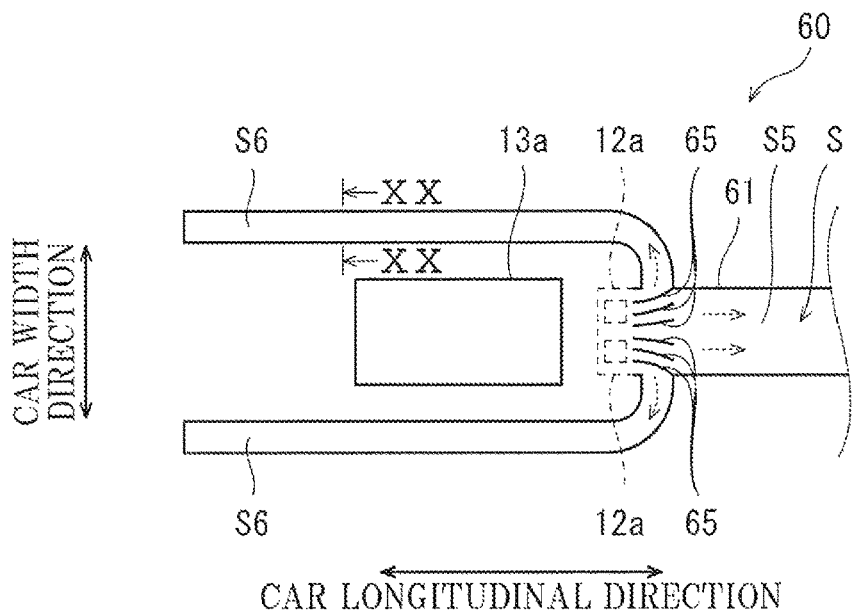
FIG. 19 is a top view and schematic sectional view showing part of the air conditioning duct according to Embodiment 3.

FIG. 19 is a top view and schematic sectional view showing part of an air conditioning duct 60 according to Embodiment 3. Specifically, FIG. 19 shows a part located at one car longitudinal direction end portion of the air conditioning duct 60. Moreover, FIG. 19 also shows a return duct 13a and (in the illustrated example, two) air feed ports 12a. The return duct 13a extends in the upper-lower direction and takes the air of the passenger room 5 in the air conditioner (not shown). The air feed ports 12a feeds the air from the air conditioner to the air flow passage S.

In the air conditioning duct 60 of the present embodiment, the air flow passage S includes a fifth air flow region S5 and a pair of sixth air flow regions S6 (corresponding to an "intake port vicinity region" of the present invention). The fifth air flow region S5 guides the air, fed from the air feed ports 12a, in a direction away from the return duct 13a along the car longitudinal direction. The pair of sixth air flow regions S6 are arranged at both sides of the return duct 13a in the car width direction. Each sixth air flow region S6 is located at a position away from the return duct 13a in the car width direction and extends in the car longitudinal direction.

A plurality of guide plates 65 are provided in the vicinity of the air feed ports 12a in the air flow passage S. The air fed from the air conditioner through the air feed ports 12a to the air flow passage S is guided by the plurality of guide plates 65 such that part of this air is guided to the fifth air flow region S5, and the rest is guided to the pair of sixth air flow regions S6.

Figure 20:
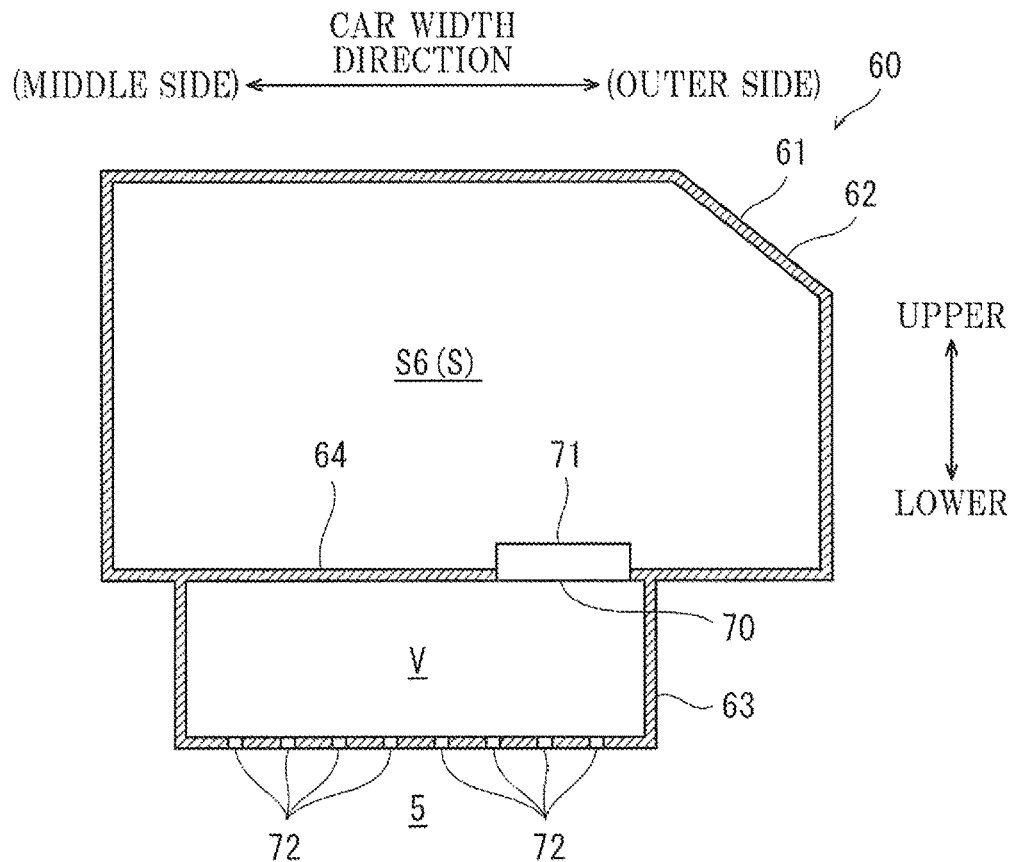
FIG. 20 is a schematic sectional view taken along line XX-XX of FIG. 19.

FIG. 20 is a schematic sectional view (front view) taken along line XX-XX of FIG. 19. The air conditioning duct 60 of the present embodiment has a chamber structure in which at least the air in the sixth air flow region S6 is blown through the chamber U to the passenger room 5. The chambers U are formed for the respective sixth air flow regions S6. The air conditioning duct 60 includes a duct wall 61 which forms the sixth air flow regions S6 and the chambers U. The duct wall 61 includes dividing walls 64 each of which separates the sixth air flow region S6 and the chamber U from each other.

The sixth air flow region S6 extends in the car longitudinal direction and guides the air, fed from the air conditioner, in the car longitudinal direction. The chamber U extends in the car longitudinal direction and is arranged adjacent to the sixth air flow region S6 in a direction perpendicular to the car longitudinal direction. In the present embodiment, the duct wall 61 includes a main duct wall 62 and a chamber wall 63. The main duct wall 62 forms the sixth air flow region S6, and the chamber wall 63 forms the chamber U. The main duct wall 62 and the chamber wall 63 may be formed by separate components or may be formed by an integrated component.

The dividing wall 64 extends in the car longitudinal direction. The dividing wall 64 extends in a horizontal direction when viewed from a direction along the car longitudinal direction. One surface (upper surface) of the dividing wall 64 faces the air flow passage S, and an opposite surface (lower surface) of the dividing wall 64 faces the chamber U. The sixth air flow region S6 is arranged above the dividing wall 64, and the chamber U is arranged under the dividing wall 64.

A plurality of communication holes 70 (corresponding to "through holes" of the present invention) lined up in the car longitudinal direction are open at the dividing wall 64. The plurality of communication holes 70 make the air flow passage S and the chamber U communicate with each other. The air in the air flow passage S is fed from the air flow passage S through the plurality of communication holes 70 to the chamber U.

The plurality of communication holes 70 are arranged so as to overlap both the sixth air flow region S6 and the chamber U in plan view. Moreover, the communication holes 70 are located at an opposite side of the return duct 13a within a range which overlaps the sixth air flow region S6 in plan view.

The dimensions, shapes, sizes, intervals, and the like of the plurality of communication holes 70 are the same as those of the communication holes 50 of Embodiment 2. For example, the ratio X1 of the opening area A of one communication hole 70 to the total $A_{all}$ of the opening areas of all the communication holes 70 that are open at the dividing wall 64 is designed so as to satisfy Formula (17) described in Embodiment 2.

Moreover, the ratio X2 of the opening area A of one communication hole 70 to the area B of one of a plurality of partial regions R formed by dividing, in the car longitudinal direction, an inner surface of a lower wall portion (including the dividing wall 64) of the main duct wall 62 facing the sixth air flow region S6 such that in plan view, each partial region R contains one communication hole 70 is designed so as to satisfy Formula (4) described in Embodiment 1.

The ratio X3 of the opening area A of one communication hole 70 to the volume V of the partial space is designed so as to satisfy Formula (18) described in Embodiment 2, the volume V being calculated by multiplying the sectional area C of the sixth air flow region S6, taken along a direction perpendicular to the car longitudinal direction, by the intervals p of the communication hole 70.

A plurality of air outlet ports 72 which make the chamber U and the passenger room 5 communicate with each other are open at a lower wall portion of the chamber wall 63. The plurality of air outlet ports 72 are the same in shape as each other and are lined up in the car width direction and the car longitudinal direction at regular intervals. For example, the lower wall portion of the chamber wall 63 is formed by punching metal.

Even when the communication holes 70 are provided at positions away from the return duct 13a in the car width direction as in the air conditioning duct 60 of the present embodiment, the pressure difference in the air flow passage S can be reduced, and the flow rate distribution of the air blown from the air conditioning duct 60 can be uniformized. Moreover, since the communication holes 70 are located at an opposite side of the return duct 13a within a range which overlaps the sixth air flow region S6 in plan view, it is possible to prevent a case where the air blown from the air conditioning duct 60 to the passenger room 5 in the vicinity of the return duct 13a is instantly taken in the return duct 13a.

OTHER EMBODIMENTS

The present invention is not limited to the above embodiments and modified examples, and various modifications may be made within the scope of the present invention.

For example, according to the air conditioning ducts having the chamber-less structures described in Embodiment 1 and Modified Examples 1 to 3, the ratio X1 falls within a range of 0.05% or more and 0.65% or less, the ratio X2 falls within a range of 2.0% or more and 7.5% or less, and the ratio X3 ($mm^2/mm^3$) falls within a range of $1.0 \times 10^{-4}$ or more and $3.4 \times 10^{-4}$ or less. However, the air conditioning duct of the present invention is not limited to this. To be specific, the air conditioning duct of the present invention may be configured to satisfy only one of a condition that the ratio X1 falls within a range of 0.05% or more and 0.65% or less, a condition that the ratio X2 falls within a range of 2.0% or more and 7.5% or less, and a condition that the ratio X3 ($mm^2/mm^3$) falls within a range of $1.0 \times 10^{-4}$ or more and $3.4 \times 10^{-4}$ or less.

For example, the through holes that are open at the lower wall portion of the duct wall as the air outlet ports 20, 30, 31, and 32 are only required to be provided such that the ratio ($mm^2/mm^3$) of the opening area A of one through hole to the volume V of one of a plurality of partial spaces formed by dividing the air flow passage S in the car longitudinal direction such that in plan view, the partial spaces correspond to the respective through holes falls within a range of $1.0 \times 10^{-4}$ or more and $3.4 \times 10^{-4}$ or less.

Moreover, in Embodiments 1 to 3, each of the opening areas A of the air outlet ports 20 and the communication holes 50 and 70 lined up in the car longitudinal direction may be designed so as to fall within a range of 200 $mm^2$ or more and 2000 $mm^2$ or less.

In the air conditioning ducts according to Embodiment 1 and Modified Examples 1 to 3, the ratio Y falls within a range of 0.25 or more and 2.5 or less. However, the present invention is not limited to this, and for example, the ratio Y may be a value larger than 2.5. Moreover, the shape of the air outlet port is a rectangular shape in plan view. However, the present invention is not limited to this, and the shape of the air outlet port may be a circular shape (such as an oval shape) in plan view. Furthermore, the intervals of the plurality of air outlet ports do not have to be equal to each other, and the opening areas of the plurality of air outlet ports may be different from each other.

In the air conditioning ducts according to Embodiment 1 and Modified Examples 1 to 3, the grooves are formed on the inner surface of the lower wall portion of the duct wall. However, the present invention is not limited to this. To be specific, the inner surface (upper surface) of the lower wall portion may be a flat surface that is constant in height in the car width direction, and the air outlet ports may be open at this flat surface.

In the air conditioning ducts according to Embodiment 1 and Modified Examples 1 to 3, the air flow passage includes the first to third air flow regions. However, the present invention is not limited to this. For example, the air conditioning duct of the present invention may be constituted by a right duct portion and a left duct portion which are not coupled to each other and are arranged so as to sandwich the lateral flow fan 14 in the car width direction. In this case, the air feed ports to which the air is fed from the air conditioner are provided at the left and right duct portions.

The air conditioning duct of the present invention is applicable to not only the integrated-distributed air conditioning system but also an integrated air conditioning system and the like.

REFERENCE SIGNS LIST 1 railcar
4 air conditioner
5 passenger room
10 air conditioning duct
11 duct wall
11c lower wall portion
12 air feed port
20, 30, 31, 32 air outlet port (through hole)
21 groove
21b bottom portion
22 air receiving plate
40 air conditioning duct
44 dividing wall
50 communication hole (through hole)
51 air receiving plate
60 air conditioning duct
64 dividing wall
70 communication hole (through hole)

S air flow passage
U chamber

The invention claimed is:

1. A railcar air conditioning duct which guides air fed from an air conditioner mounted on a railcar,
the railcar air conditioning duct comprising:
a duct wall forming an air flow passage which guides the air, fed from the air conditioner, in a car longitudinal direction; and
a plurality of through holes lined up in the car longitudinal direction, the through holes being open at a lower wall portion of the duct wall as air outlet ports through which the air in the air flow passage is blown from the air flow passage toward a passenger room, wherein:
a ratio of an opening area of one of the through holes to an area of one of a plurality of partial regions formed by dividing, in the car longitudinal direction, an inner surface of the lower wall portion such that in plan view, the partial regions contain the respective through holes falls within a range of 2.0% or more and 7.5% or less;
air receiving plates which are located in the air flow passage and receive the air flowing through the air flow passage in the car longitudinal direction project upward at opening edge portions of the respective through holes so as to be located at a far side from the air conditioner, and a top edge of each of the air receiving plates is a free edge;
an outer surface of the lower wall portion of the duct wall faces the passenger room in the railcar;
a groove extending in the car longitudinal direction is formed at an inner surface opposite to the outer surface of the lower wall portion;
the groove includes:
a pair of side walls opposed to each other in a car width direction, and
a bottom wall located between the inner surface and the outer surface of the lower wall portion in an upper-lower direction and connecting lower end portions of the pair of side walls;
and
the plurality of through holes are provided at the bottom wall of the groove.

2. The railcar air conditioning duct according to claim 1, further comprising an air feed port through which the air is fed from the air conditioner, wherein
the air flow passage has a chamber-less structure which faces both the air feed port and the through holes.

3. The railcar air conditioning duct according to claim 1, wherein a length of each of the through holes in the car longitudinal direction falls within a range of 0.25 time or more and 2.5 times or less a length of the through hole in a car width direction.

4. The railcar air conditioning duct according to claim 1, wherein:
the opening areas of the plurality of through holes are equal to each other; and
the plurality of through holes are lined up in the car longitudinal direction at regular intervals.

5. The railcar air conditioning duct according to claim 1, wherein:
a return duct which extends in an upper-lower direction and takes the air from the passenger room into the air conditioner is provided at a car width direction middle of the railcar;
the air flow passage includes an intake port vicinity region extending in the car longitudinal direction at a position away from the return duct in a car width direction; and
the through holes are arranged so as to overlap the intake port vicinity region in plan view.

6. The railcar air conditioning duct according to claim 5, wherein the through holes are located at an opposite side of the return duct within a range which overlaps the intake port vicinity region in plan view.

7. The railcar air conditioning duct according to claim 1, further comprising horizontal plate portions each located between two of the through holes which are adjacent to each other in the car longitudinal direction, wherein
the air receiving plates project at end portions of the respective horizontal plate portions so as to be located at a near side from the air conditioner.

8. A railcar air conditioning duct which guides air fed from an air conditioner mounted on a railcar,
the railcar air conditioning duct comprising:
a duct wall forming an air flow passage which guides the air, fed from the air conditioner, in a car longitudinal direction; and
a plurality of through holes lined up in the car longitudinal direction, the through holes being open at the duct wall as air outlet ports through which the air in the air flow passage is blown from the air flow passage toward a passenger room, wherein:
a ratio of an opening area of one of the through holes to a total of opening areas of all the through holes that are open at the duct wall falls within a range of 0.05% or more and 0.65% or less,
air receiving plates which are located in the air flow passage and receive the air flowing through the air flow passage in the car longitudinal direction project upward at opening edge portions of the respective through holes so as to be located at a far side from the air conditioner, and a top edge of each of the air receiving plates is a free edge;
an outer surface of the lower wall portion of the duct wall faces the passenger room in the railcar;
a groove extending in the car longitudinal direction is formed at an inner surface opposite to the outer surface of the lower wall portion;
the groove includes:
a pair of side walls opposed to each other in a car width direction, and
a bottom wall located between the inner surface and the outer surface of the lower wall portion in an upper-lower direction and connecting lower end portions of the pair of side walls; and
the plurality of through holes are provided at the bottom wall of the groove.

9. The railcar air conditioning duct according to claim 8, further comprising an air feed port through which the air is fed from the air conditioner, wherein
the air flow passage has a chamber-less structure which faces both the air feed port and the through holes.

10. The railcar air conditioning duct according to claim 8, wherein a length of each of the through holes in the car longitudinal direction falls within a range of 0.25 time or more and 2.5 times or less a length of the through hole in a car width direction.

11. The railcar air conditioning duct according to claim 8, wherein:
the opening areas of the plurality of through holes are equal to each other; and
the plurality of through holes are lined up in the car longitudinal direction at regular intervals.

12. The railcar air conditioning duct according to claim 8, wherein:

a return duct which extends in an upper-lower direction and takes the air from the passenger room into the air conditioner is provided at a car width direction middle of the railcar;

the air flow passage includes an intake port vicinity region extending in the car longitudinal direction at a position away from the return duct in a car width direction; and the through holes are arranged so as to overlap the intake port vicinity region in plan view.

13. The railcar air conditioning duct according to claim 12, wherein the through holes are located at an opposite side of the return duct within a range which overlaps the intake port vicinity region in plan view.

14. The railcar air conditioning duct according to claim 8, further comprising horizontal plate portions each located between two of the through holes which are adjacent to each other in the car longitudinal direction, wherein the air receiving plates project at end portions of the respective horizontal plate portions so as to be located at a near side from the air conditioner.

* * * * *